US011580122B2

(12) United States Patent
Tan et al.

(10) Patent No.: US 11,580,122 B2
(45) Date of Patent: Feb. 14, 2023

(54) SIGNAL DETECTION AND VISUALIZATION USING POINT-IN-TIME ARCHITECTURE DATABASES

(71) Applicant: Veeva Systems Inc., Pleasanton, CA (US)

(72) Inventors: Zhen Tan, North York (CA); Marius K. Mortensen, Burlington (CA); Piotr Kuchnio, Toronto (CA); Prashant Raghav, Toronto (CA); Shanul Srivastava, Brampton (CA)

(73) Assignee: Veeva Systems Inc., Pleasanton, CA (US)

( * ) Notice: Subject to any disclaimer, the term of this patent is extended or adjusted under 35 U.S.C. 154(b) by 105 days.

(21) Appl. No.: 17/156,367

(22) Filed: Jan. 22, 2021

(65) Prior Publication Data

US 2022/0114171 A1 Apr. 14, 2022

Related U.S. Application Data

(63) Continuation of application No. 17/069,751, filed on Oct. 13, 2020, now Pat. No. 10,942,936.

(51) Int. Cl.

| | |
|---|---|
| ***G06F 16/24*** | (2019.01) |
| ***G06F 16/2458*** | (2019.01) |
| ***G06F 16/21*** | (2019.01) |
| ***G06F 16/242*** | (2019.01) |
| ***G06F 16/2457*** | (2019.01) |
| ***G06F 16/215*** | (2019.01) |

(52) U.S. Cl.
CPC ........ *G06F 16/2462* (2019.01); *G06F 16/215* (2019.01); *G06F 16/219* (2019.01); *G06F 16/2445* (2019.01); *G06F 16/24573* (2019.01)

(58) Field of Classification Search
CPC ............ G06F 16/24573; G06F 16/219; G06F 16/2462
See application file for complete search history.

(56) References Cited

U.S. PATENT DOCUMENTS

| | | | |
|---|---|---|---|
| 9,239,722 B1 | 1/2016 | Calahan et al. | |
| 2018/0239991 A1* | 8/2018 | Weller | G06F 16/907 |
| 2018/0330300 A1* | 11/2018 | Runkana | G06Q 10/06 |

OTHER PUBLICATIONS

Oracle® Health Sciences Empirica Signal and Topics User Guide, 8.0, Sep. 2014, 883 pages.
Oracle® Health Sciences Empirica Signal 8.1, Signal Secure Configuration Guide, 2016, 27 pages.

* cited by examiner

*Primary Examiner* — Loc Tran
(74) *Attorney, Agent, or Firm* — Baker & McKenzie

(57) ABSTRACT

Systems and methods are provided for using point-in-time architecture (PTA) databases. An exemplary method includes: entering first data, received from a first data source, into a first PTA database; receiving a first instruction to process the first data using a first statistical operation; executing the first statistical operation for the first data, resulting in first output data; filtering the first output data based on a user-selected attribute; and performing multiple stages of a data processing operation for the first output data.

16 Claims, 18 Drawing Sheets

100
105
Server
110
NETWORK
125a
SECURE COMPUTING ENVIRONMENT
Data Source
130a
SECURE COMPUTING ENVIRONMENT
Data Source
130b
125b
125n
SECURE COMPUTING ENVIRONMENT
Data Source
130n

300

HOME INBOX CASES TRANSMISSIONS ▾ AGGREGATE REPORTS ▾ ANALYTICS ▾ LIBRARY ▾ ACTION ITEMS BUSINESS ADMIN (QUICK ACCESS) ▾ + CREATE ▾ ADMIN

ALL DOCUMENTS ▾

SIGNAL PRODUCT PROFILE >
SIGNAL PRODUCT PROFILE: PRODUCT 1 ☆ ACTIVE

DETAILS
DATA SOURCE 1
302

SHARING SETTINGS
304

▾ DETAILS

NAME PRODUCT 1 PRODUCT PRODUCT 1
ORGANIZATION AGENCY A

▾ DATA SOURCE

REPORTING PERIOD: DATE 1 TO DATE 2
LAST UPDATED: DATE A BY JOHN DOE
REFRESH 310

STATISTICAL ANALYSIS 1K, 750, 500, 250, 0
10, 20, 30, 40, 50, 60, 70
PRR VALUE

312
GLOTATHOUSE DECREASED
MEDDRA REFERNCE PT
DECREASED (10050276)*
PRR: 75.22
g2: 452.25
NO. OF CASES: 8

▾ LIST OF DETECTED SIGNALS
SEARCH
REFRESH 306A 306B 306C 306D 306E

| ADVERSE EVENT TERM | REPOSITORY REFERENCE | SOURCE | TOTAL CASES (N) | M1 | M2 | M3 | M4 | M5 |
|---|---|---|---|---|---|---|---|---|
| E1 | ER1 | DATA SOURCE 1 | 5000 | 234 | 334 | 209 | 275 | 333 |
| E2 | ER2 | DATA SOURCE 2 | 2500 | 189 | 243 | 309 | 214 | 336 |
| E3 | ER3 | DATA SOURCE 3 | 5000 | 334 | 209 | 275 | 234 | 333 |
| E4 | ER3 | DATA SOURCE 4 | 2500 | 189 | 243 | 309 | 214 | 336 |
| E5 | ER4 | DATA SOURCE 5 | 2500 | 189 | 243 | 309 | 214 | 336 |

Figure 13:
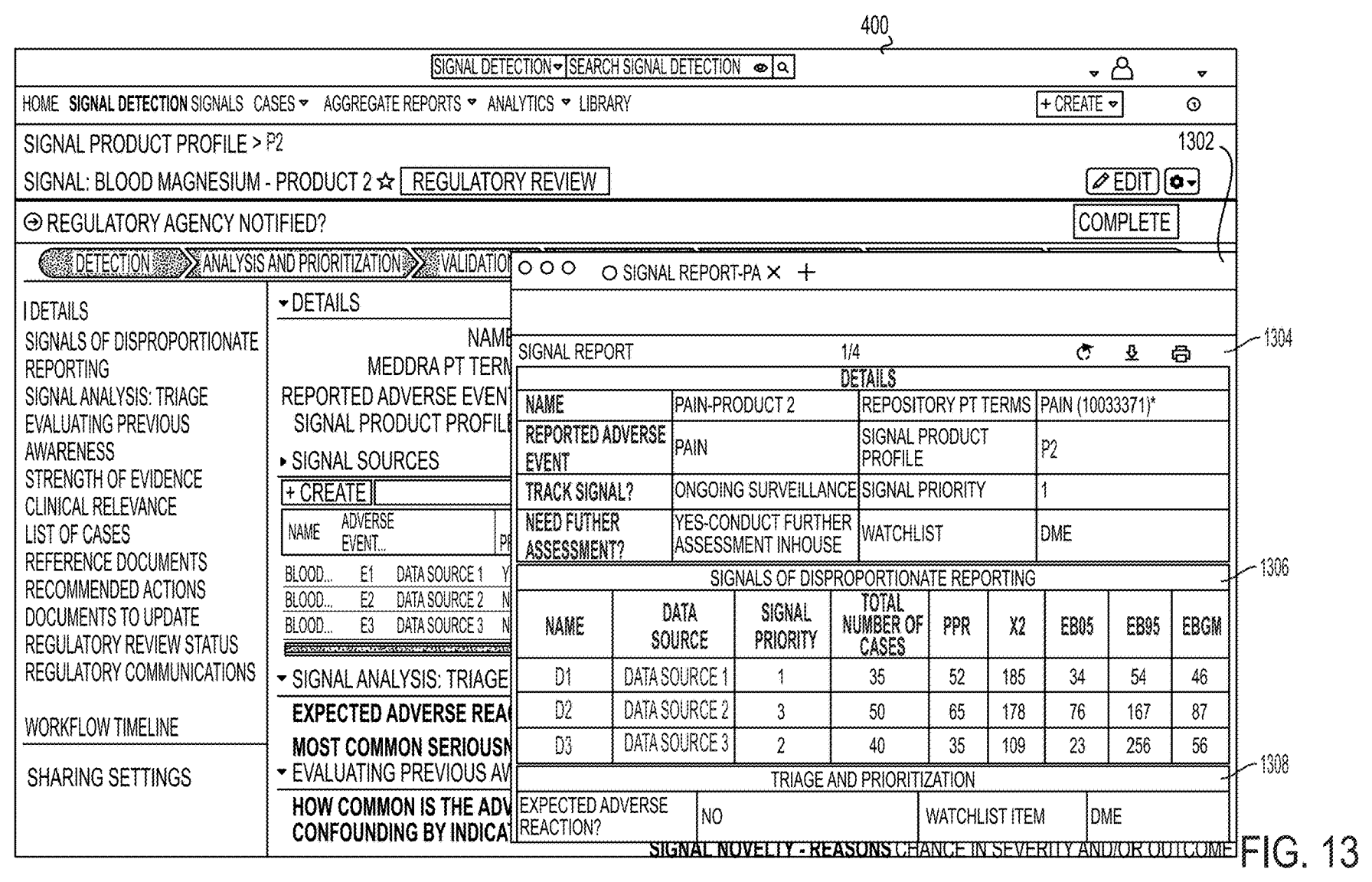

SIGNAL DETECTION SEARCH SIGNAL DETECTION

HOME SIGNAL DETECTION SIGNALS CASES AGGREGATE REPORTS ANALYTICS LIBRARY + CREATE

SIGNAL PRODUCT PROFILE > P2

1302

SIGNAL: BLOOD MAGNESIUM - PRODUCT 2 ☆ REGULATORY REVIEW EDIT

REGULATORY AGENCY NOTIFIED? COMPLETE

DETECTION ANALYSIS AND PRIORITIZATION VALIDATIO

DETAILS
SIGNALS OF DISPROPORTIONATE REPORTING
SIGNAL ANALYSIS: TRIAGE
EVALUATING PREVIOUS AWARENESS
STRENGTH OF EVIDENCE
CLINICAL RELEVANCE
LIST OF CASES
REFERENCE DOCUMENTS
RECOMMENDED ACTIONS
DOCUMENTS TO UPDATE
REGULATORY REVIEW STATUS
REGULATORY COMMUNICATIONS

WORKFLOW TIMELINE

SHARING SETTINGS

DETAILS
NAME
MEDDRA PT TERM
REPORTED ADVERSE EVENT
SIGNAL PRODUCT PROFILE

SIGNAL SOURCES
+ CREATE

| NAME | ADVERSE EVENT... | | PR |
|---|---|---|---|
| BLOOD... | E1 | DATA SOURCE 1 | Y |
| BLOOD... | E2 | DATA SOURCE 2 | N |
| BLOOD... | E3 | DATA SOURCE 3 | N |

SIGNAL ANALYSIS: TRIAGE
EXPECTED ADVERSE REA
MOST COMMON SERIOUSN
EVALUATING PREVIOUS AV
HOW COMMON IS THE ADV
CONFOUNDING BY INDICA

SIGNAL REPORT-PA × +

SIGNAL REPORT 1/4

1304

DETAILS

| NAME | PAIN-PRODUCT 2 | REPOSITORY PT TERMS | PAIN (10033371)* |
|---|---|---|---|
| REPORTED ADVERSE EVENT | PAIN | SIGNAL PRODUCT PROFILE | P2 |
| TRACK SIGNAL? | ONGOING SURVEILLANCE | SIGNAL PRIORITY | 1 |
| NEED FUTHER ASSESSMENT? | YES-CONDUCT FURTHER ASSESSMENT INHOUSE | WATCHLIST | DME |

1306

SIGNALS OF DISPROPORTIONATE REPORTING

| NAME | DATA SOURCE | SIGNAL PRIORITY | TOTAL NUMBER OF CASES | PPR | X2 | EB05 | EB95 | EBGM |
|---|---|---|---|---|---|---|---|---|
| D1 | DATA SOURCE 1 | 1 | 35 | 52 | 185 | 34 | 54 | 46 |
| D2 | DATA SOURCE 2 | 3 | 50 | 65 | 178 | 76 | 167 | 87 |
| D3 | DATA SOURCE 3 | 2 | 40 | 35 | 109 | 23 | 256 | 56 |

1308

TRIAGE AND PRIORITIZATION

| EXPECTED ADVERSE REACTION? | NO | WATCHLIST ITEM | DME |
|---|---|---|---|

SIGNAL NOVELTY - REASONS CHANGE IN SEVERITY AND/OR OUTCOME

| DETAILS | | | |
|---|---|---|---|
| NAME | PAIN-PRODUCT 2 | REPOSITORY PT TERM | PT TERM 1 |
| REPORTED ADVERSE EVENT | PAIN | SIGNAL PRODUCT PROFILE | PRODUCT 2 |
| TRACK SIGNAL? | ONGOING SURVEILLANCE | SIGNAL PRIORITY | 1 |
| NEED FURTHER ASSESSMENT? | YES-CONDUCT FURTHER ASSESSMENT INHOUSE | WATCHLIST | DME |

SIGNALS OF DISPROPORTIONATE REPORTING

| NAME | DATA SOURCE | SIGNAL PRIORITY | TOTAL NUMBER OF CASES | PPR | X2 | EB05 | EB95 | EBGM |
|---|---|---|---|---|---|---|---|---|
| D1 | DATA SOURCE 1 | 1 | 35 | 52 | 185 | 34 | 54 | 46 |
| D2 | DATA SOURCE 2 | 3 | 50 | 65 | 178 | 76 | 167 | 87 |
| D3 | DATA SOURCE 3 | 2 | 40 | 35 | 109 | 23 | 256 | 56 |

| TRIAGE AND PRIORITIZATION | | | |
|---|---|---|---|
| EXPECTED ADVERSE REACTION? | NO | WATCHLIST ITEM | DME |
| IME? | IME | MOST COMMON SERIOUSNESS | RESULTS IN DEATH |
| OUTCOME | FATALITIES RELATED TO A NEWLY OBSERVED REACTION | CONFOUNDING BY INDICATION | NO |
| EXPOSURE TO SPECIFIC POPULAR ON GROUPS? | NO | LIST IMPACTED POPULATION GROUPS | PEDIATRIC |

| EVALUATING PREVIOUS AWARENESS | | | |
|---|---|---|---|
| SIGNAL | STRONG-NEW SIGNAL OR SIGNIFICANT CHANGE TO THE EXPECTED BEHAVIOUR OF AN EXPECTED ADVERSE EVENT | SIGNAL REASONS | NEW UNEXPECTED SIGNAL WITH SERIOUS OUTCOME |
| PREVIOUS KNOWLEDGE OF ADVERSE EVENT | WEAK-NO INFORMATION IN SAFETY DOCUMENTS | PREVIOUS KNOWLEDGE OF REACTION-REASONS | NO INFORMATION IN EXISTING SAFETY DOCUMENTATION |
| ACTION TAKEN | SIGNAL NOT PREVIOUSLY REPORTED | HOW COMMON IS THE | 1 IN 10 TO 1 IN 100-COMMON |

FIG. 14

SIGNAL DETECTION AND VISUALIZATION USING POINT-IN-TIME ARCHITECTURE DATABASES

CROSS-REFERENCE TO RELATED APPLICATIONS

This application claims priority to and is a continuation of U.S. patent application Ser. No. 17/069,751, filed Oct. 13, 2020, the disclosure of which is incorporated by reference in its entirety for all purposes.

TECHNICAL FIELD

The present disclosure relates to methods and systems for detecting or obtaining signals and managing, analyzing, and visualizing detected signals.

BACKGROUND

Researchers, scientists, industry players, academics, government regulators, and other stakeholders are increasingly in need of data that is accessible, easy to interpret, analyze, and/or visualize.

SUMMARY

According to one aspect of the subject matter described in this disclosure, a method for using a point-in-time architecture (PTA) database is provided. The method includes receiving, using one or more computing device processors, first data from a first data source. The first data includes a first record associated with a first attribute and a first event, and a second record associated with a second attribute and a second event. Also, the method includes organizing, using the one or more computing device processors, the first data in a first PTA database. For each record, the first PTA database includes a first time associated with creation of an entry in the first PTA database for the record and a second time associated with manipulation of the entry in the first PTA database for the record. The method includes enabling, using the one or more computing device processors, access to a historical version of the first PTA database without destroying a current version of the first PTA database.

In addition, the method includes enabling, using the one or more computing device processors, access to a history of manipulation of the first PTA database. The second data from a second data source is received, and the second data includes a third record associated with a third attribute and a third event, and a fourth record associated with a fourth attribute and a fourth event. Moreover, the method includes organizing, using the one or more computing device processors, the second data in the first PTA database or a second PTA database. A first instruction to process the first data and the second data using a first statistical operation is received. The first statistical operation comprises one or more first parameters. Also, the method includes executing, using the one or more computing device processors, the first statistical operation for the first data and the second data. Additionally, the method includes receiving, using the one or more computing device processors, a second instruction to process the first data and the second data using a second statistical operation. The second statistical operation comprises one or more second parameters.

Also, the method includes executing, using the one or more computing device processors, the second statistical operation for the first data and the second data. The method further includes receiving, using the one or more computing device processors, a third instruction to filter first output data resulting from the execution of the first statistical operation for the first data and the second data, or filter second output data resulting from the execution of the second statistical operation for the first data and the second data. The filtering of the first output data or the second output data is based on a user-selected attribute associated with records comprised in the first data or the second data, respectively. Furthermore, the method includes enabling, using the one or more computing device processors, simultaneous graphical display of the first output data resulting from the execution of the first statistical operation for the first data and the second data, and graphical display of the second output data resulting from the execution of the second statistical operation for the first data and the second data, on a single user interface.

According to another aspect of the subject matter described in this disclosure, a system for using a point-in-time architecture (PTA) database, the system is provided. The system includes at least one PTA database having a first data set and a second data set. Also, the system includes one or more computing device processors. The system further includes one or more computing device memories, coupled to the first data set, the second data set, and the one or more computing device processors. The one or more computing device memories store instructions executed by the one or more computing device processors.

The instructions are configured to: receive first data from a first data source, wherein the first data comprises a first record associated with a first attribute and a first event, and a second record associated with a second attribute and a second event; organize the first data in a first PTA database, wherein for each record, the first PTA database comprises a first time associated with creation of an entry in the first PTA database for the record and a second time associated with manipulation of the entry in the first PTA database for the record; enable access to a historical version of the first PTA database without destroying a current version of the first PTA database; enable access to a history of manipulation of the first PTA database; receive second data from a second data source, wherein the second data comprises a third record associated with a third attribute and a third event, and a fourth record associated with a fourth attribute and a fourth event; organize the second data in the first PTA database or a second PTA database; receive a first instruction to process the first data and the second data using a first statistical operation, wherein the first statistical operation comprises one or more first parameters; execute the first statistical operation for the first data and the second data; receive a second instruction to process the first data and the second data using a second statistical operation, wherein the second statistical operation comprises one or more second parameters; execute the second statistical operation for the first data and the second data; receive a third instruction to filter first output data resulting from the execution of the first statistical operation for the first data and the second data, or filter second output data resulting from the execution of the second statistical operation for the first data and the second data, wherein the filtering of the first output data or the second output data is based on a user-selected attribute associated with records comprised in the first data or the second data, respectively; and enable simultaneous graphical display of the first output data resulting from the execution of the first statistical operation for the first data and the second data, and graphical display of the second output data resulting from the execution of the second statistical operation for the first data and the second data, on a single user interface.

According to another aspect of the subject matter described in this disclosure, a method for using a point-in-time architecture (PTA) database is provided. The method includes receiving, using one or more computing device processors, first data from at least a first data source. The first data comprises a first record associated with a first attribute and a first event, and a second record associated with a second attribute and a second event. Also, the method includes organizing, using the one or more computing device processors, the first data in a first PTA database. For each record, the first PTA database includes a first time associated with creation of an entry in the first PTA database for the record and a second time associated with manipulation of the entry in the first PTA database for the record. Moreover, the method includes enabling, using the one or more computing device processors, access to a historical version of the first PTA database without destroying a current version of the first PTA database. The method further includes enabling, using the one or more computing device processors, access to a history of manipulation of the first PTA database.

In addition, the method includes receiving, using the one or more computing device processors, a first instruction to process the first data using at least one first statistical operation. The at least one first statistical operation includes one or more first parameters. The method further includes executing, using the one or more computing device processors, the at least one first statistical operation for the first data. Additionally, the method includes receiving, using the one or more computing device processors, a second instruction to filter first output data resulting from the execution of the at least one first statistical operation for the first data. The filtering of the first output data or the second output data is based on a user-selected attribute associated with records comprised in the first data, respectively. Furthermore, the method includes enabling, using the one or more computing device processors, graphical display of the first output data resulting from the execution of the at least one first statistical operation for the first data.

BRIEF DESCRIPTION OF THE DRAWINGS

The disclosure is illustrated by way of example, and not by way of limitation in the figures of the accompanying drawings in which like reference numerals are used to refer to similar elements. The various elements shown in the figures that follow may be optional depending on a given embodiment without departing from the principles provided in this disclosure.

FIG. 3 shows an example interface for visualizing statistical data derived from one or more signal sources, according to one embodiment.

FIG. 13 shows an example interface for generating a signal report, according to one embodiment.

FIG. 14 shows a signal report generated using information in the example interface of FIG. 12, according to one embodiment.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms “a”, “an” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

System Environment

Figure 1:
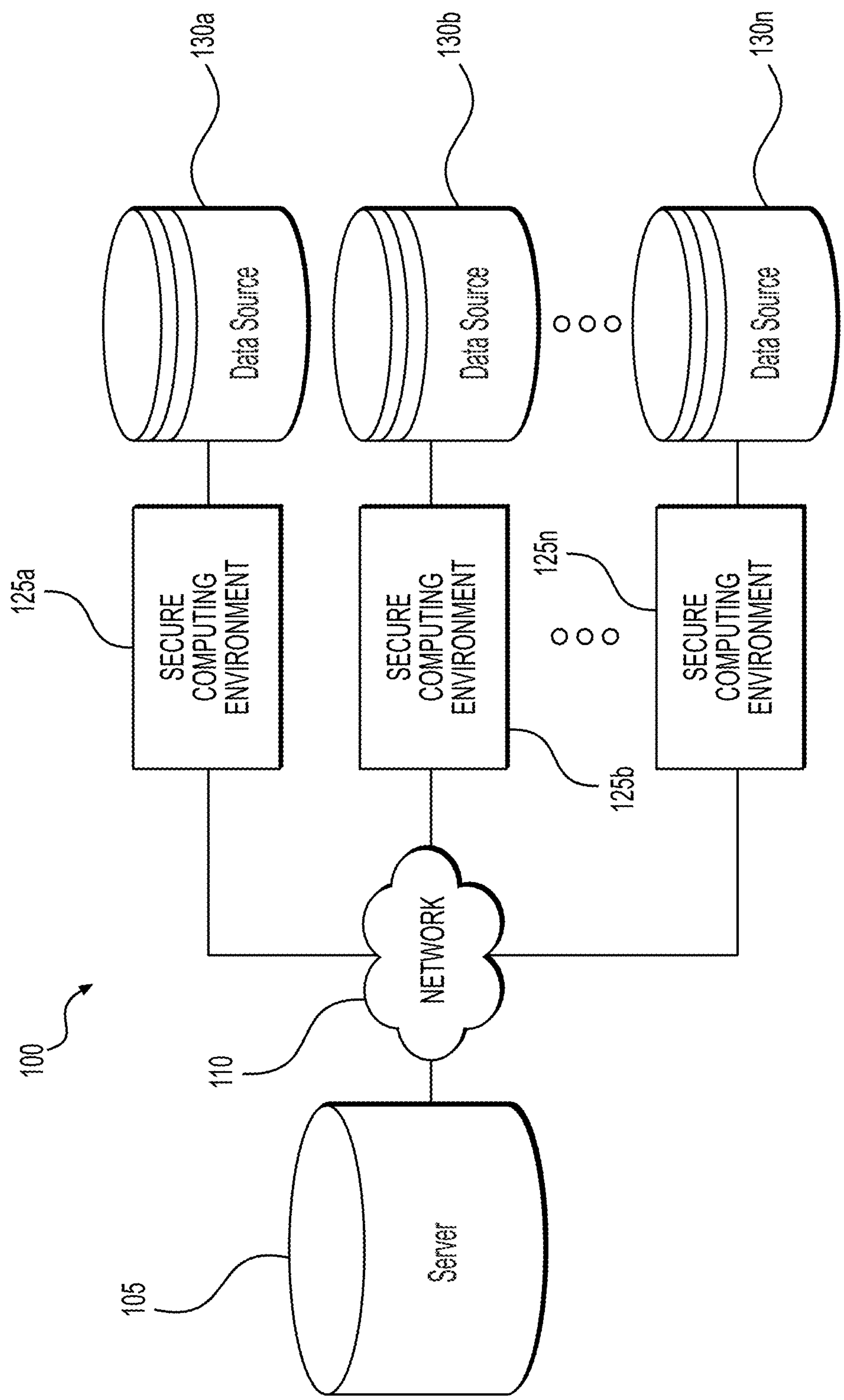
FIG. 1 is a high-level network system for accessing, managing, and visualizing structured data, according to one embodiment.

Illustrated in FIG. 1 is a high level network system 100 for generating interfaces that access, maintain, analyze, and display structured data. In the depicted implementation, the system 100 may include a server 105 communicatively coupled to a plurality of secure computing environments 125 via the network 110. The secure computing environments 125 may in turn be communicatively coupled to a data source 130. While a server 105 is illustrated, the disclosed principles and techniques could be expanded to include multiple servers 105.

The server 105, according to some embodiments, is configured to store a plurality of structured data in a secure environment requiring authentication before access is granted to the structured data. According to one implementation, the structured data includes hierarchical data having varying and connected categories/levels that describe a plurality of aspects of the structured data. In some cases, the structured data in the server 105 is sourced or obtained from third-party scientific sources, and/or from third-party regulatory agencies, and/or from academic sources, and/or from industrial sources, etc. According to one implementation, the structured data includes terminology data associated with Medical Dictionary for Regulatory Activities ("MedDRA") dictionaries, WHODrug dictionary, or the like. In addition, the server 105 may be configured to manage or otherwise maintain the integrity and/or version updates of the structured data so that a user (e.g., a user of the secure computing environment) does not have to deal with such data maintenance processes as the structured data changes and/or grows. In one embodiment, the server 105 provides (e.g., using a snapshot reference) the most current version of the structured data to a user of the system. In other embodiments, the server 105 can also provide historical versions of the structured data when necessary or needed. Furthermore, the server 105 may include mechanisms that execute operations of data decompression operations, data decryption operations, and data decoding operations associated with the structured data so that the user is effectively isolated from such operations.

Moreover, the server 105 allows for easy associating, tagging, or coding new phenomena/events/cases (e.g., in the medical area or any other area) with structured data from the server 105. In some cases, the tagging or coding is automatically executed by the server 105. In some instances, coding/tagging decisions are snapshotted to the secure computing environment and are not affected by updates occurring at the server 105. In one embodiment, the server 105 enables a user to control version information of the structured data for follow-up cases/events. In addition, the server 105 allows a user (e.g., user of the secure computing environment 125) to transition from accessing structured data from the data source 130 to accessing data from the server 105. In one embodiment, the data accessed from the server 105 and/or from the data source 130 may include one or more signals associated with a specific product. These signals may include statistical data associated with a product, testing data associated with a product, regulatory data associated with a product, usage data associated with the product, etc. In one embodiment, the product includes a pharmaceutical product, a medical product, or a health-related product.

The server 105 may be implemented within a computing device such as a mainframe server, a content server, a communication server, a laptop computer, a desktop computer, a handheld computing device, a virtual machine, a cloud-based computing solution and/or service, and/or the like. The server 105 may include a plurality of computing devices configured to communicate with one another and/or implement the techniques described herein. In some instances, the server 105 may include various elements of a computing environment as described with reference to FIGS. 2A and/or 2B. For example, the server 105 may include a processing system 202, a memory 204, an input/output (I/O) system 206, and a communication system 208. A user (e.g., database administrator) may operate/maintain the server 105 either locally or remotely as the case may require.

The server 105 may be configured to have storage logic that is executable to store structured data that is shared across multiple secure computing environments 125. According to one implementation, the server 105 includes a plurality of non-volatile/non-transitory storage media such as solid state storage media, hard disk storage media, virtual storage media, cloud-based storage drives, storage servers, and/or the like. The plurality of storage media may be configured to store data from a plurality of sources. For example, the server 105 may include storage logic that is executable to store structured data derived from, for example, medical data, research data, education data, pharmaceutical data, product data, government data, etc. According to some implementations, the storage logic of the server 105 may be configured to automatically monitor and/or update relevant structured data obtained from a third-party source. For example, the storage logic of the server 105 may periodically monitor updates associated with structured data (e.g., dictionary of medical terms for research and regulatory purposes) from third-party organizations/sources and automatically update different versions of the structured data within one or more storage media of the server 105. In one embodiment, the storage logic of the server 105 manipulates or otherwise formats the structured data such that user interfaces generated by a secure computing environment 125 can seamlessly access/retrieve and present the structured data to a user. In addition, structured data from the server 105 may be accessed on a regulated basis via credential access, for example. This regulated basis may be determined, in part, by licenses, privileges, and other levels of authorization dictated by a user's credentials.

The data store 130 may include storage logic for storing data from third-party sources. The data store 130 may include a plurality of non-volatile/non-transitory storage media such as solid state storage media, hard disk storage media, virtual storage media, cloud-based storage drives, storage servers, and/or the like. According to some embodiments, the data store 130 may include logic that updates data stored within its storage devices based on updates issued by the server 105. In one embodiment, the data store 130 and/or the server 105 may include one or more point-in-time architecture (PTA) databases.

As previously discussed, the network 110 facilitates communication between the server 105 and the secure computing environment 125. The network 110 may also allow different secure computing environments 125 to communicate with each other. According to one embodiment, the network 110 may include a plurality of networks. For instance, the network 110 may include any wired/wireless communication network that facilitates communication between the components of the network system 100. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a fiber optics network, a laser-based network, and/or the like.

The secure computing environment 125 is configured to generate one or more user interfaces for accessing, analyzing, and displaying the structured data. The secure computing environment 125 may also be configured to generate and or display interfaces that visualize one or more signals derived from one or more sources. As discussed further below, the interfaces generated by the secure computing environment 125 may include visualizations of statistical data of a product and may allow a user to configure different aspects of the statistical data as needed. According to some implementations, the secure computing environment 125 includes functionalities and/or enhanced security features that allow a user to securely access and/or securely manage structured data and/or manage one or more detected signals. As shown more clearly in the exemplary functional and system diagrams of FIGS. 2A and 2B, the secure computing environment 125 includes a processing system 202, a memory 204, an I/O system 206, and a communication system 208. The processing system 202, the memory 204, the I/O system 206, and the communication system 208 may include one or more subsystems that perform one or more of the operations described herein. Additionally, each system of the secure computing environment 125 may be operatively and/or otherwise communicatively coupled with each other so as to facilitate one or more operations described herein. The secure computing environment 125 may include general hardware, specifically-purposed hardware, and/or a combination thereof.

Figure 2A:
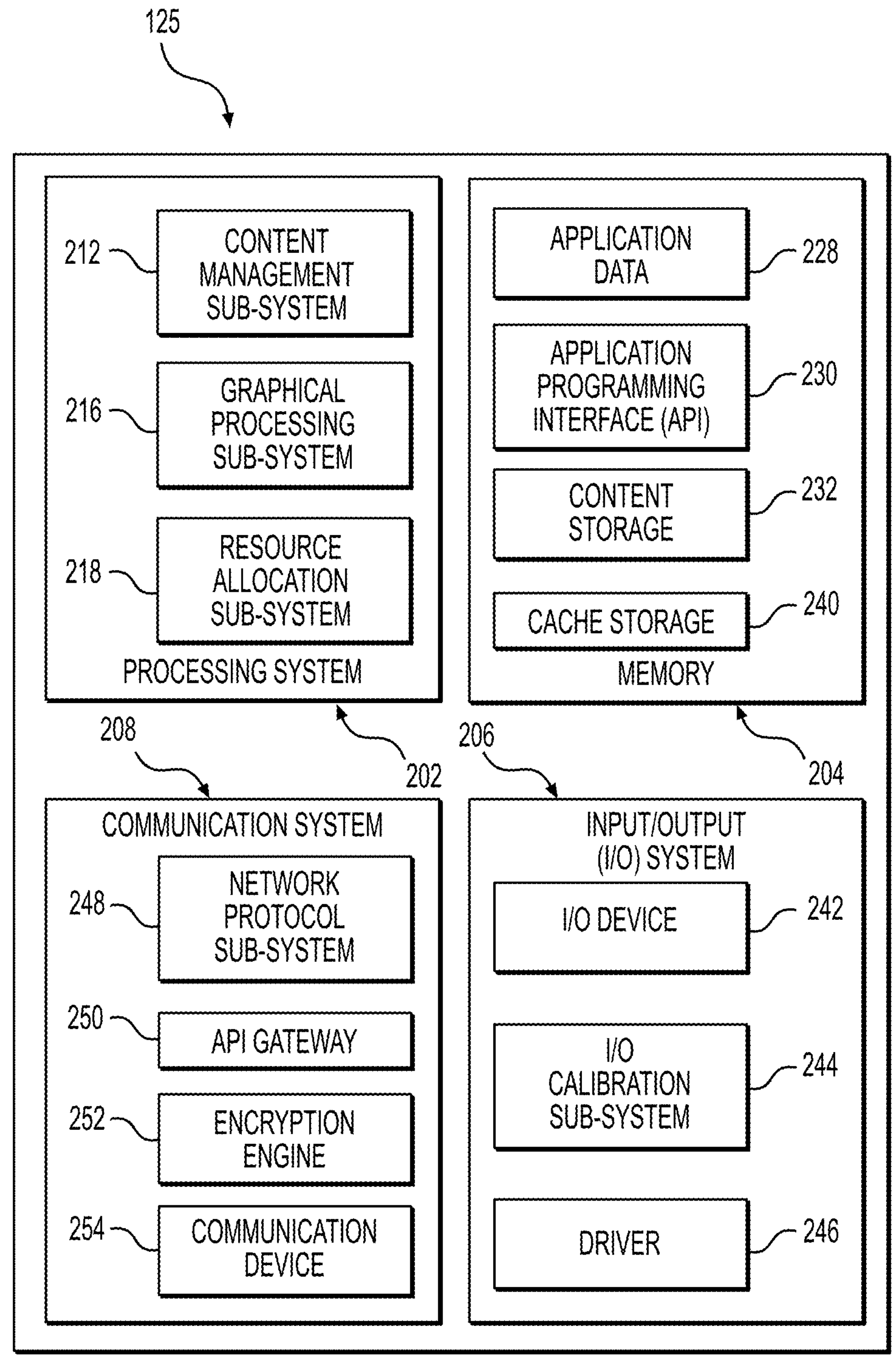
FIG. 2A is a functional block diagram of a computing environment for accessing and visualizing structured data, according to one embodiment.
Figure 2B:
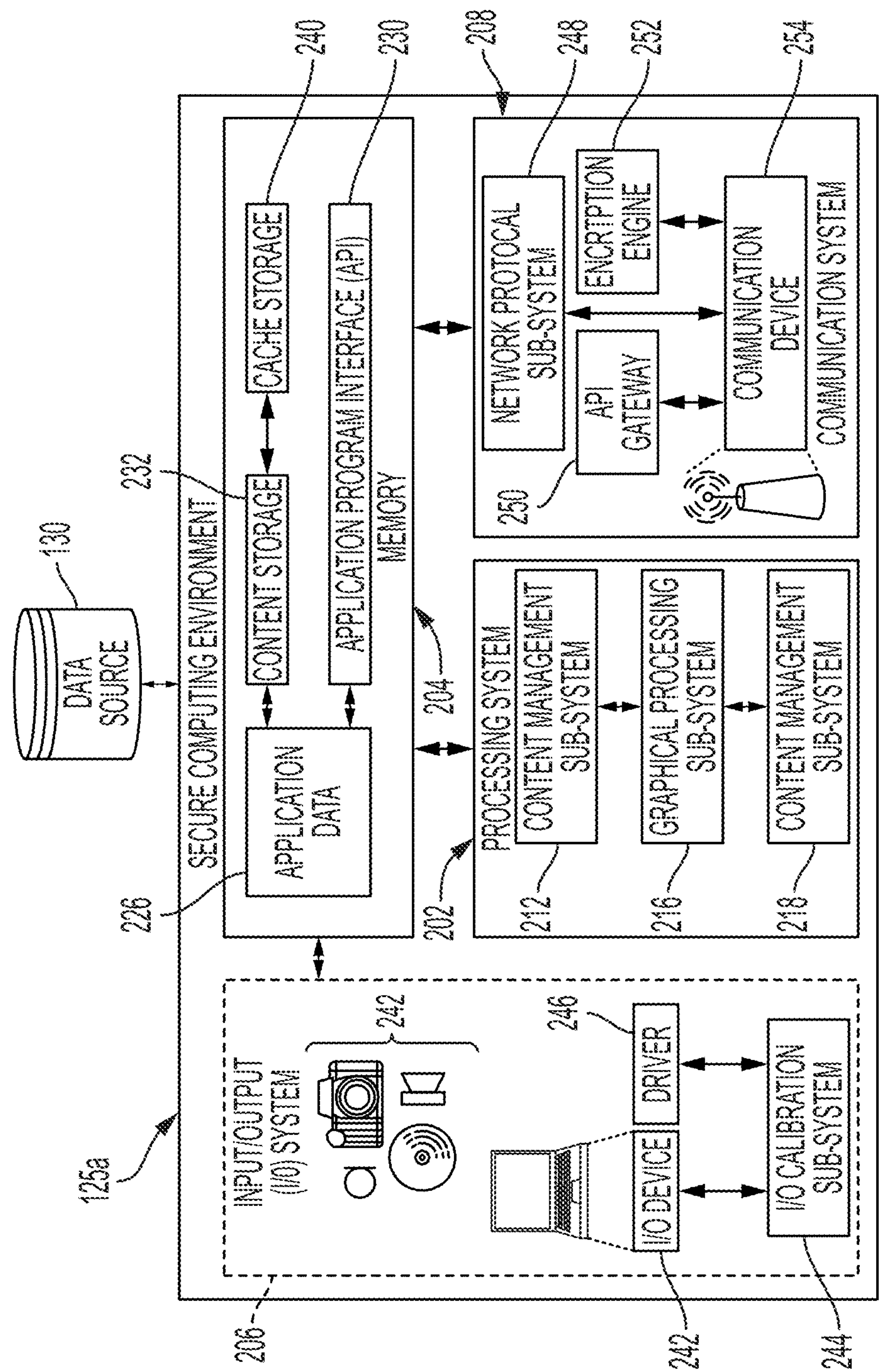
FIG. 2B is a detailed system diagram of FIG. 2A, according to one embodiment.

The processing system 202 may control the memory 204, the I/O system 206, and the communication system 208, as well as any included subsystems, elements, components, devices, and/or functions performed by the memory 204, I/O system 206, and the communication system 208. Additionally, any actions described in this disclosure as being performed by a processor or one or more processors of a computing device or one or more computing device processors and/or one or more computing system processors may be executed by the processing system 202 of FIGS. 2A and 2B. Further, while one processing system 202 is shown in FIGS. 2A and 2B, multiple processing systems may be present and/or otherwise included in the secure computing environment 125 or elsewhere in the overall network system 100 of FIG. 1. Thus, while instructions may be described as being executed by the processing system 202 (and/or various subsystems of the processing system 202), the instructions may be executed simultaneously, serially, and/or otherwise by one or multiple processing systems 202 on one or more computing devices.

According to one embodiment, the processing system 202 may be implemented as one or more computer processor chips and/or graphical processing unit (GPU) chips and may include a hardware device capable of executing computer instructions. The processing system 202 may execute instructions, codes, computer programs, and/or scripts. The instructions, codes, computer programs, and/or scripts may be received from the I/O system 206, the communication system 208, and/or stored in the memory 204, and/or received from the other subsystems of the secure computing environment 125 and/or received from other computing environments.

In some embodiments, the processing system 202 may include subsystems such as a content management subsystem 212, a graphical processing subsystem 216, and a resource allocation subsystem 218. Each of the aforementioned subsystems of the processing system 202 may be communicatively or operably coupled to each other.

The content management sub-system 212 may facilitate generation, modification, analysis, transmission, and/or presentation of content. Content may be file content, media content, structured data content, user interfaces, or any combination thereof. In some instances, content on which the content management system 212 operates includes structured data from the server 105, structured data from the local repository 130, user interface data, device information, images, text, themes, audio files, video files, documents, and/or the like. Additionally, the content management subsystem 212 may control the audio-visual environment and/or appearance of application data during execution of various processes. In some embodiments, the content management subsystem 212 may interface with a third-party content server and/or third-party memory locations for execution of its operations.

The graphical processing subsystem 216 may facilitate generation, modification, analysis, processing, transmission, and/or presentation of the content described above, as well as any data described herein. In some embodiments, the graphical processing subsystem 216 may be used to render content for presentation on a computing device (e.g., via a graphical user interface of the computing device). The graphical processing subsystem 216 may also include multiple graphical processing subsystems and therefore may be configured to perform and/or execute multiple processes in parallel. In some implementations, the graphical processing subsystem 216 may be used in conjunction with components of the memory 204, the I/O system 206, the communication system 208, and/or a combination thereof.

The resource allocation subsystem 218 may facilitate the determination, monitoring, analysis, and/or allocation of computing resources throughout the secure computing environment 125 and/or other computing environments. Computing resources of the secure computing environment 125 may be used by the processing system 202, the memory 204, the I/O system 206, and/or the communication system 208. These resources may include processing power, data storage space, network bandwidth, and/or the like. Accordingly, the resource allocation subsystem 218 may include sensors and/or other specially-purposed hardware for monitoring performance of each system and/or subsystem of the secure computing environment 125, as well as hardware for responding to the computing-resource needs of each system and/or subsystem. In some embodiments, the resource allocation subsystem 218 may use computing resources of a second secure computing environment separate and distinct from the secure computing environment 125 to facilitate a desired operation.

The memory 204 may be used for storing, recalling, receiving, transmitting, and/or accessing various files and/or data (e.g., structured data) and/or signals associated with a product during the operation of the secure computing environment 125. For example, the memory 204 may store, recall, and/or update structured data and/or one or more signals from the server 105 and/or from the local repository as the case may be. In some embodiments, the memory 204 may store instructions and/or data that may be executed by the processing system 202. For instance, the memory 204 may store instructions that execute operations associated with one or more systems and/or one or more subsystems of the secure computing environment 125. For example, the memory 204 may store instructions for the processing system 202, the I/O system 206, the communication system 208, and for itself.

Memory 204 may include various types of data storage media such as solid state storage media, hard disk storage media, virtual storage media, and/or the like. Memory 204 may include dedicated hardware elements such as hard drives and/or servers, as well as software elements such as cloud-based storage drives. In some implementations, memory 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing system 202. For example, the instructions stored may be a command, a current operating state of secure computing environment 125, an intended operating state of secure computing environment 125, and/or the like. As a further example, data stored in the memory 204 may include instructions related to various methods and/or functionalities described herein. The ROM device may be a non-volatile memory device that may have a smaller memory capacity than the memory capacity of a secondary storage of the secure computing environment. The ROM device may be used to store instructions and/or data that may be read during execution of computer instructions. In some embodiments, access to both the RAM device and ROM device may be faster to access than access to the secondary storage of the secure computing environment 125. Secondary storage may comprise one or more disk drives and/or tape drives which may be used for non-volatile/non-transitory storage of data or as an over-flow data storage device of the secure computing environment 125 if the RAM device is not large enough to hold all working data. Secondary storage may be used to store programs that may be loaded into the RAM device when such programs are selected for execution.

Turning back to FIG. 2A, the memory 204 may include subsystems such as application data 228, application programming interface 230, content storage 232, and cache storage 240. Application data 228 may facilitate deployment, storage, access, execution, and/or utilization of an application utilized by the secure computing environment 125 and/or any other computing environments described herein. As such, application data 228 may store any information and/or data associated with an application. Application data 228 may further store various pieces of information and/or data associated with the operation of an application and/or with the secure computing environment 125 as a whole, such as a status of computing resources (e.g., processing power, memory availability, resource utilization, and/or the like), runtime information, user interfaces, systems to direct execution of operations described herein to, user permissions, security credentials, and/or the like.

The application programming interface (API) 230 may facilitate deployment, storage, access, execution, and/or utilization of information associated with APIs of secure computing environment 125 and/or any other computing environment described herein. For example, secure computing environment 125 may include one or more APIs for various devices, applications, systems, subsystems, elements, and/or other computing environments to allow communication between one or more applications associated with the secure computing environment 125. Accordingly, API 230 may include API databases containing information that may be accessed and/or used by applications, systems, subsystems, elements, and/or operating systems of other devices and/or computing environments in communication with the secure computing environment 125. In some cases, the API 230 may enable the server 105 and the secure computing environment 125 to communicate with each other.

The content storage 232 may facilitate deployment, storage, access, and/or utilization of information associated with structured data as further discussed below. In one embodiment, content storage 232 may communicate with a content management system 212 to receive and/or transmit content (e.g., structured data, media content, etc.).

The I/O system 206 may include hardware and/or software elements for the secure computing environment 125 to receive, and/or transmit, and/or present information useful for generating one or more interfaces for retrieving and displaying structured data according to some embodiments of this disclosure. For example, elements of the I/O system 206 may be used to receive input from a user of the secure computing environment 125. As described herein, I/O system 206 may include subsystems such as I/O device 242, I/O calibration subsystem 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with secure computing environment 125. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing system 202 and/or memory 204 to execute operations associated with generating user interfaces for retrieving and visualizing structured data.

The I/O calibration system 244 may facilitate the calibration of the I/O device 242. For example, I/O calibration system 244 may detect and/or determine one or more settings of I/O device 242, and then adjust and/or modify settings so that the I/O device 242 may operate more efficiently. In some embodiments, I/O calibration system 244 may use a driver 246 (or multiple drivers) to calibrate I/O device 242 as needed. For example, driver 246 may include software that is to be installed by I/O calibration system 244 so that an element of secure computing environment 125 (or an element of another computing environment) may recognize and/or integrate with I/O device 242.

The communication system 208 may facilitate establishment, maintenance, monitoring, and/or termination of communications between the secure computing environment 125 and other computing environments, third-party server systems, and/or the like. Communication system 208 may also facilitate internal communications between various elements (e.g., systems and/or subsystems) of secure computing environment 125. In some embodiments, communication system 208 may include a network protocol subsystem 248, an API gateway 250, an encryption engine 252, and/or a communication device 254. These systems and/or subsystems of the communication system 208 may be implemented as hardware, software, or a combination thereof.

The network protocol subsystem 248 may facilitate establishment, maintenance, and/or termination of a communication connection for the secure computing environment 125 via a network (e.g., network 110). For example, network protocol subsystem 248 may detect and/or define a communication protocol required by a particular network and/or network type. Communication protocols utilized by network protocol subsystem 248 may include Wi-Fi protocols, Li-Fi protocols, cellular data network protocols, Bluetooth® protocols, internet protocols, WiMAX protocols, Ethernet protocols, power line communication (PLC) protocols, and/or the like. In some embodiments, facilitation of communication for the secure computing environment 125 may include transforming and/or translating data from a first communication protocol to a second communication protocol. In some embodiments, network protocol subsystem 248 may determine and/or monitor an amount of data traffic to determine which network protocol is to be used for establishing a secure communication connection, transmitting data, and/or performing retrieval and subsequent visualization of structured data.

The application programming interface (API) gateway 250 may allow other devices and/or computing environments and/or applications external to the secure computing environment 125 to access the API 230 of the memory 204. For example, a computing system may access the API 230 of the secure computing environment 125 via the API gateway 250. In some embodiments, API gateway 250 may be required to validate user credentials associated with a user of a computing device (e.g., a device external to the secure computing environment 125) prior to providing access to the API 230 to the user. API gateway 250 may include instructions for the secure computing environment 125 and thereby communicate with external devices and/or between components of the secure computing environment 125.

The encryption engine 252 may facilitate translation, encryption, encoding, decryption, and/or decoding of information received, transmitted, and/or stored by the secure computing environment 125. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for secure computing environment 125 with external systems and/or devices. In some embodiments, communication device 254 may include one or more radio transceivers, chips, analog front end (AFE) units, antennas, processing units, memory, other logic, and/or other components to implement communication protocols (wired or wireless) and related functionality for facilitating communication for WAS system 125. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

To manage and evaluate data received from data sources, server 105 may provide to each computing environment 125 a number of user interfaces. In this context, signals are data from the data sources that have processed using one or more statistical operations. These user interfaces may allow each computing environment to manage and evaluate one more detected signals based on the data. Moreover, the user interface may allow the users of each computing environment 125 to perform signal detection analysis using the statistical metrics described in herein including point-in-time statistical metrics. Also, the one or more detected signals may be configured or otherwise parameterized using a plurality of stages. The stages may include a detection phase, an analysis and prioritization phase, a validation phase, an assessment phase, a risk management phase, and a regulatory review phase. This is described in further detail hereinafter.

User Interfaces

FIG. 3 illustrates an example interface 300 that is generated for visualizing statistical data derived from one or more signal sources. The one or more signal sources may comprise one or more data sources (e.g., server 105 and/or data source 130 of FIG. 1) that store structured data. Moreover, the interface 300 may be generated in a secure computing environment (e.g., secure computing environment 125 of FIG. 1) according to some embodiments. The interface 300 includes a details section 302, a statistical analysis chart 304, one or more statistical metrics 306A . . . 306E, and one or more data sources 308 associated with at least one detected signal (e.g., a record, a file, or other data associated with a product). In addition, the interface 300 may include event terms E1-E5, one or more repository references ER1-ER4, and one or more data sources (e.g., data source 1 to data source 5) associated with at least one detected signals. According to one embodiment, the interface 300 may include other features other than those shown in FIG. 3. Furthermore, the interface 300 may be generated in response to passing one or more detected signals through a number of processing stages or phases as discussed in association with FIGS. 4-15.

The details section 302 of FIG. 3 provides a summary of information associated with one or more detected signals. For example, the details section 302 may include information such as the name of a product (e.g., product 1) and an organization that produces the product (e.g., Agency A). Thus, the illustrated embodiment of interface 300 represents a visualization of one or more detected signals associated with product 1 manufactured by agency A. The statistical analysis chart 304 provides a statistical diagram or a graph, or a plot, or a graphical illustration based on the one or more statistical metrics 306A . . . 306E. In one embodiment, the statistical analysis chart 304 also includes a hover summary 312 providing specific details associated with specific data points within the statistical chart 304. In some cases, the statistical analysis chart 304 includes a bubble chart depicting multi-dimensions (e.g., 2-dimensions, 3-dimensions, 4-dimensions, etc.) of data associated with one or more detected signals. For example, a bubble comprised in the bubble chart may have a first dimension representing a first statistical metric, a second dimension representing a second statistical metric, and a third dimension representing a magnitude, an amount, or a size of the bubble. In some cases, the bubble chart beneficially provides relationships and patters between data sets, multiple values (hundreds or thousands of values), values differing by substantially significant orders of magnitude, etc., associated with one or more detected signals. Such identified relationships can help prioritize areas of focus of the bubble chart. For example, certain areas of focus of the bubble chart can help identify clusters that indicate optimal project executions and considerations (e.g., cost, value, and risk) associated with the one or more detected signals. While a bubble chart is shown in the illustrated embodiment, the chart 304 may include funnel charts, categorical column charts, unit charts, bar charts, stacked charts, multiple line charts, cherry charts, etc.

In some instances, the interface 300 may represent a signal profile product having a chart (e.g., statistical analysis chart 304), a grid (e.g., layout of statistical metrics 306A . . . 306E) and an auto-coded structured data (e.g., Medical Dictionary for Regulatory Activities ("MedDRA") dictionaries). The auto-coded structured data may include structured, tiered or stratified data that allows for words or terms that are similar to low level terms within the strata of the structured data to be used for automatic updating of terms associated with one or more signal sources and/or associated with a product associated with the signal profile product. Such updates may include taking snapshots/updates of the low level terms in the strata of the structured data from a repository and automatically updating similar low level terms associated with the interface 300. According to one embodiment, automatic coding occurs at a record level such that one or more records with terms associated with the interface 300 are updated to a specific version of records in the repository within which is the structured data. A snapshot reference may be used to automatically update certain records with terms associated with the interface 300 without updating all the records associated with the interface 300. A snapshot reference may include a reference object including one or more identifiers, one or more tagging/coding data, and at least one version of information. According to one embodiment, an automatic coding or update operation may be executed on one or more terms associated with the interface 300 using the tagging data. The update operation may include at least automatically updating version information associated with a record/term associated with the interface 300. The update operation may also include automatically updating a plurality of records/terms associated with the interface 300 based on updated records/terms within a repository (e.g., a MedDRA dictionary or a WHODrug dictionary).

In one embodiment, the one or more detected signals may be configured or otherwise parameterized using a plurality of stages. Such configuring and/or parameterizing of the one or more detected signals may be initiated by activating (e.g., clicking) a button such as the button 310 of the interface 300. For example, the plurality of stages used to configure the one or more detected signals may include a detection phase, an analysis and prioritization phase, a validation phase, an assessment phase, a risk management phase, and a regulatory review phase. These phases are further discussed in association with FIGS. 4-16.

In some embodiments, the statistical metrics 306A . . . 306E may be exclusively different statistical metrics. In some embodiments, each statistical metric 306A . . . 306E may include one or more statistical operations. In some embodiments, the one more statistical operations may include Empirical Bayes Geometric Mean (EBGM), Proportional Reporting Ratio (PRR), Chi-Square, or the like.

Figure 4:
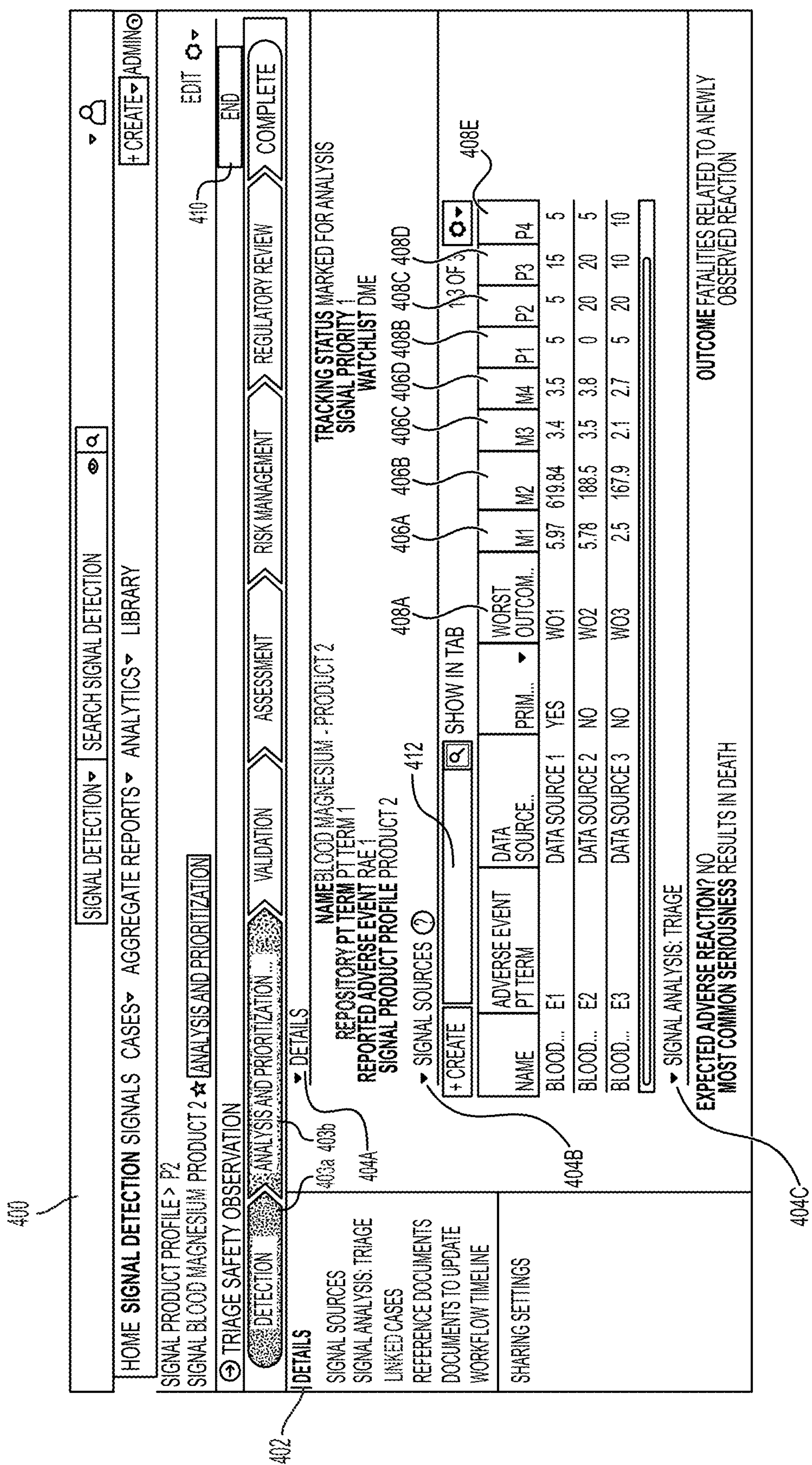
FIG. 4 shows an example interface for configuring one or more signals detected from one or more data sources, according to one embodiment.

FIG. 4 shows an interface 400 for configuring one or more signals detected from one or more data sources. In one embodiment, the one or more signals are associated with a product (e.g., a pharmaceutical product) that has to go through a plurality of regulatory and testing phases in order to be approved for use. As seen in the figure, the interface 400 includes a first details section 402, a status section 403 (e.g., 403*a* and 403*b*), a second details section 404A, a signal sources section 404B, and a signal analysis section 404C associated with a product (e.g., product 2). As seen in the figure, the first details section 402 includes summary data associated with the second details section 404A, the signal sources section 404B, and the signal analysis section 404C. For example, the first details section 402 may include the number of sources from which the one or more signals are obtained, the type of analysis being conducted on the one or more detected signals, reference documents associated with analysis of the one or more detected signals, a workflow timeline indicative of an analysis phase of the one or more detected signals, etc.

The status section 403 indicates a specific stage/phase and/or a status associated with a specific stage of a configuration process for one or more detected signals. For example, the status section 403*a* indicates that the one or more signals associated with a product have been successfully detected. Successful signal detection may be further indicated by activating a first color (e.g., green) associated with the status section 403*a*. Similarly, the status section 403*b* indicates that an analysis and prioritizing stage of a signal configuration process is ongoing and once completed, a second color (e.g., green) associated with the status section 403*b* may be activated to indicate completion of the analysis and prioritizing stage of the signal.

The second details section 404A provides contextual data associated with a product for which the one or more signals have been detected. For example, the second details section 404A may include a first property associated with a product (e.g., blood magnesium level associated with product 2), a repository term (e.g., PT term 1), an event identifier (e.g., RAE1) associated with the aforementioned structured data, a signal product profile for the product in question, etc. Moreover, the signal sources section 404B may include a grid format that outlines one or more event terms E1 . . . E3 associated with structured data, or associated with one or more data sources (data source 1 to data source 3) from which the one or more detected signals were obtained. The grid format may also include one or more outcomes 408A (e.g., worst outcomes WO1 . . . WO3) resulting from using the product being analyzed, and may also include other signal properties 408B, 408C, 408D, and 408D as needed. The signal properties (e.g., P1 . . . P4) may include data such as deaths reported associated with using the product being analyzed, life threatening reactions associated with using the product, hospitalizations associated with using the product, and other serious cases associated with using the product. Also included in the grid format are one or more statistical metrics 406A . . . 406D with corresponding entries within the grid format. A button 412 of the signal sources section 404B may allow for additional analysis features to be added to the signal sources section 404B. The signal analysis section 404C may allow a user to provide parameters that assign degrees of urgency based on one or more data (e.g., statistical metrics, signal properties, outcomes, etc.) to thereby decide or otherwise prioritize an order for managing or handling identified issues (e.g., problems) associated with the product being analyzed. According to one embodiment, activating a button 410 of the interface 400 allows a user to further configure data associated with the signal analysis section 404C as further discussed below in association with FIG. 5.

Figure 5:
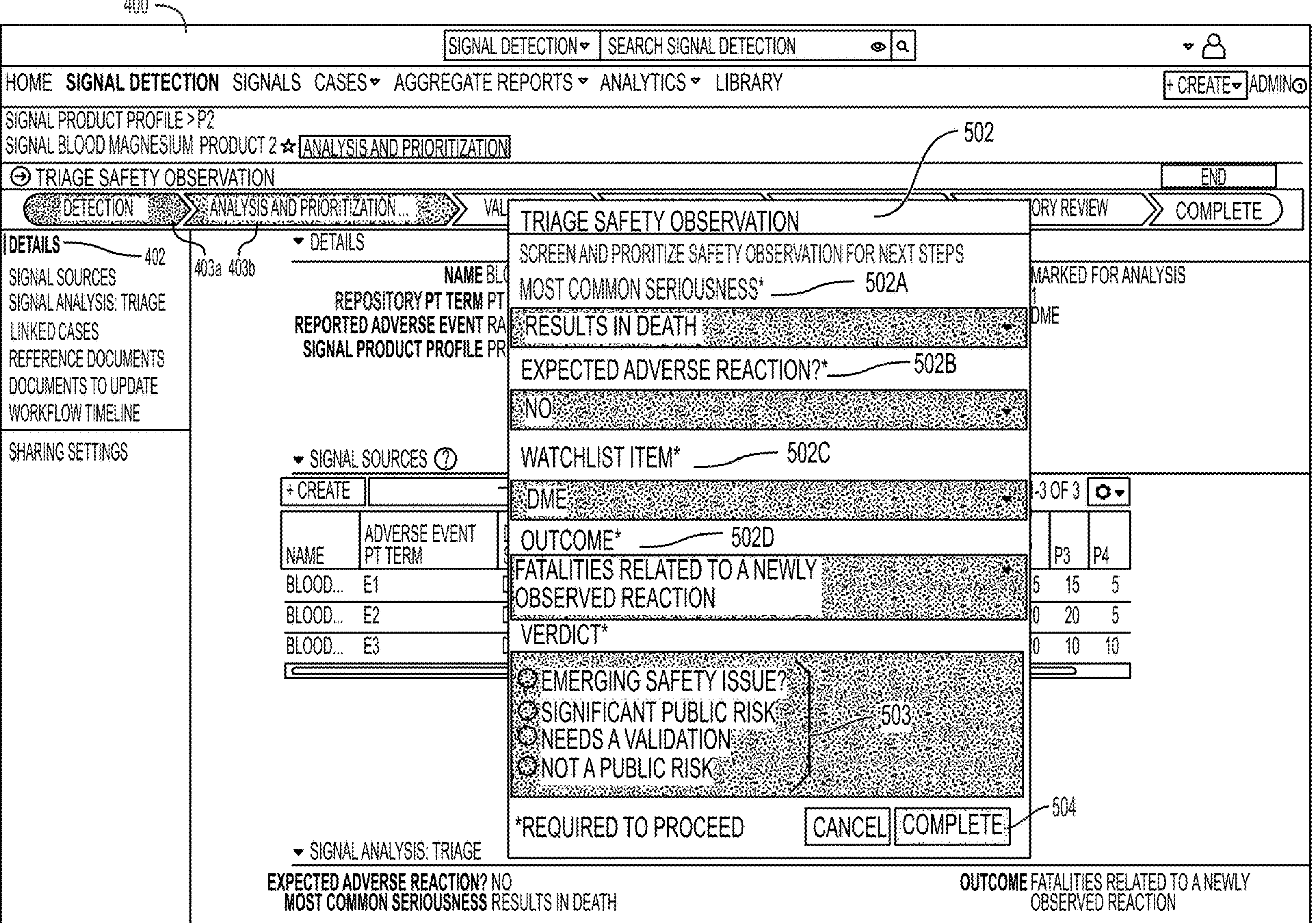
FIG. 5 depicts an example interface for configuring one or more detected signal for analysis, according to one embodiment.

FIG. 5 shows an example interface for prioritizing, confirming, or otherwise executing a triage operation on one or more detected signal associated with a given product (e.g., product 2). In one embodiment, a pop-up menu 502 may be generated for executing the triage operation in response to a user activating the button 410 of FIG. 4. The pop-up menu 502 includes a first field 502A for selecting an option associated with a seriousness property resulting from using the product, a second field 502B for selecting an option associated with a reaction (e.g., an adverse reaction) resulting from using the given product, a third field 502C for flagging whether the given product should be on a watch-list, a fourth field 502D for selecting an outcome associated with using the given product, and at least one checkbox 503 for establishing a verdict associated with using the given drug. In response to the user executing the triage operation by selecting or parameterizing aspects of the given product based on fields 502A . . . 502D and based on the at least one checkbox 503, the pop-up menu 502 may transition the user interface 400 into the interface shown in FIG. 6.

Figure 6:
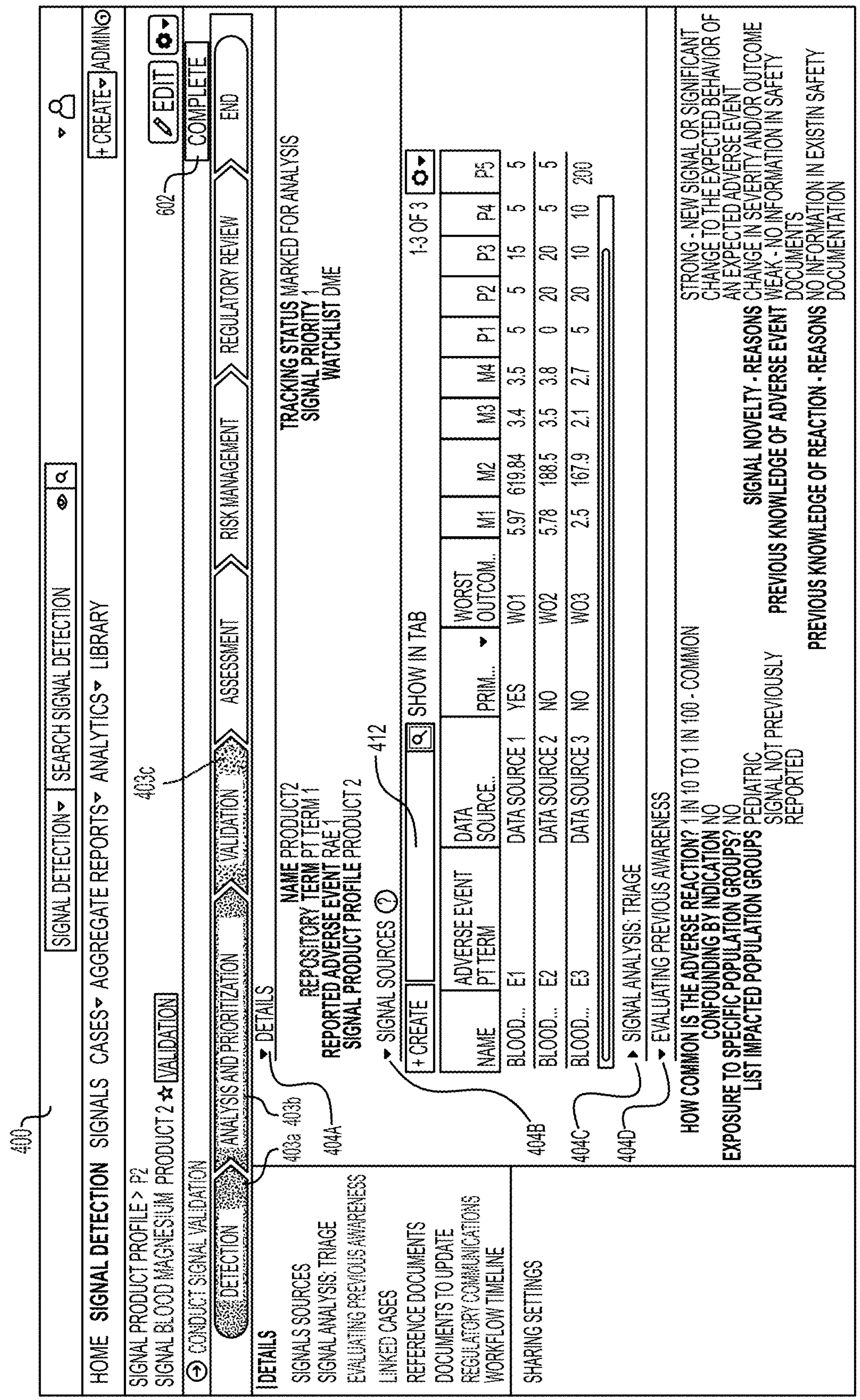
FIG. 6 shows an example interface for validating one or more detected signals, according to one embodiment.
Figure 7:
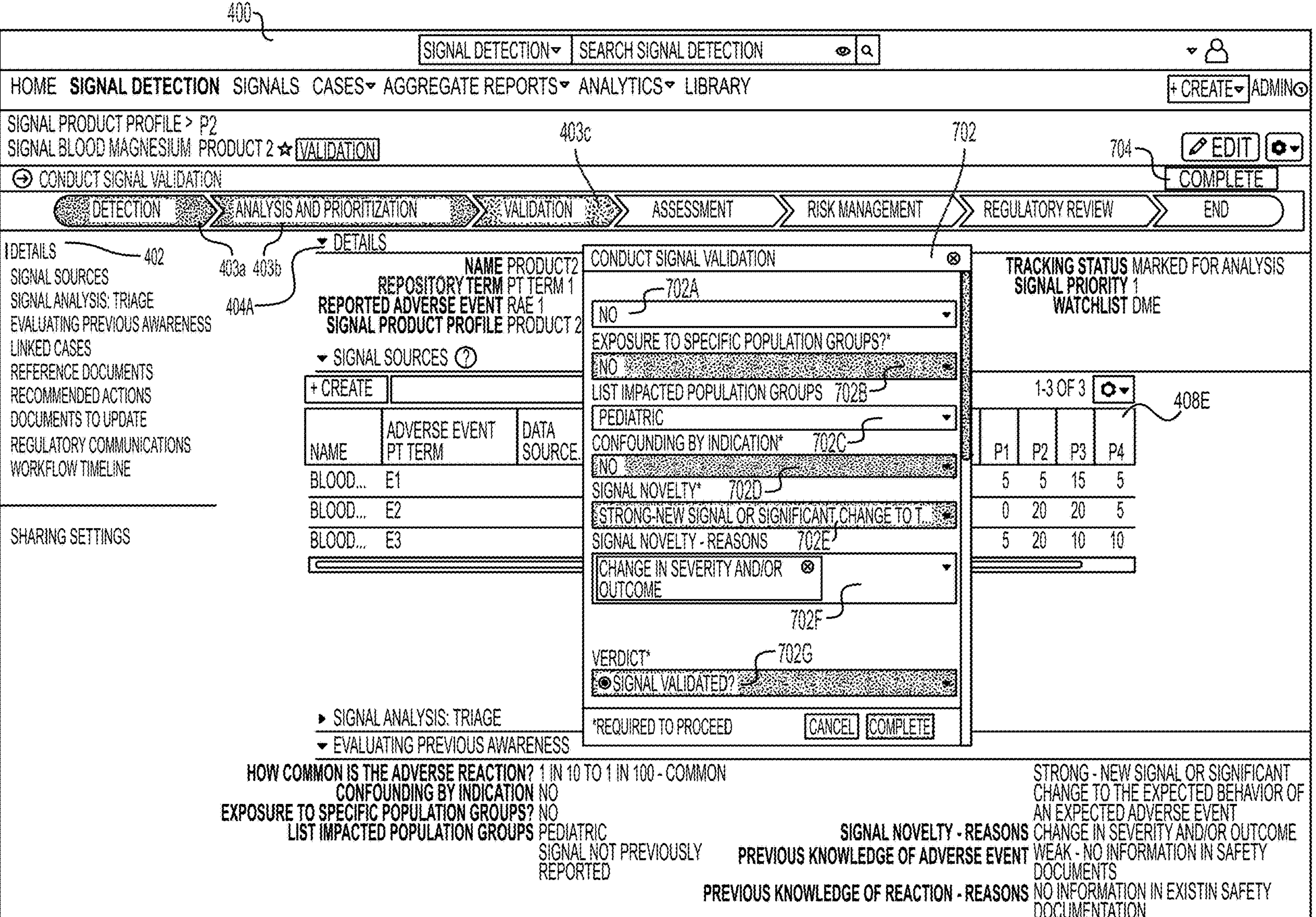
FIG. 7 shows and example interface for transitioning one or more detected signals from a validation phase to an assessment phase, according to one embodiment.

In FIG. 6, the interface 400 now includes a status section 403*c* that is indicative of a validation stage of processing the one or more received signals. At this processing stage, the interface 400 can display an evaluation section 404D which includes reaction (e.g., adverse reaction) data associated with using the given product, exposure data associated with one or more groups using the given product, population impact data, etc. At the validation stage, the user may activate a button 602 to generate the pop-up menu 702 of FIG. 7. The pop-up menu 702 may include a plurality of fields 702A . . . 702G that can be used to parameterize the one or more detected signals during the validation stage. In response to validating the one or more signals using the pop-up menu 702, the user may activate the button 704 to update the interface 400 to transition to an assessment stage as shown in FIG. 8.

Figure 8:
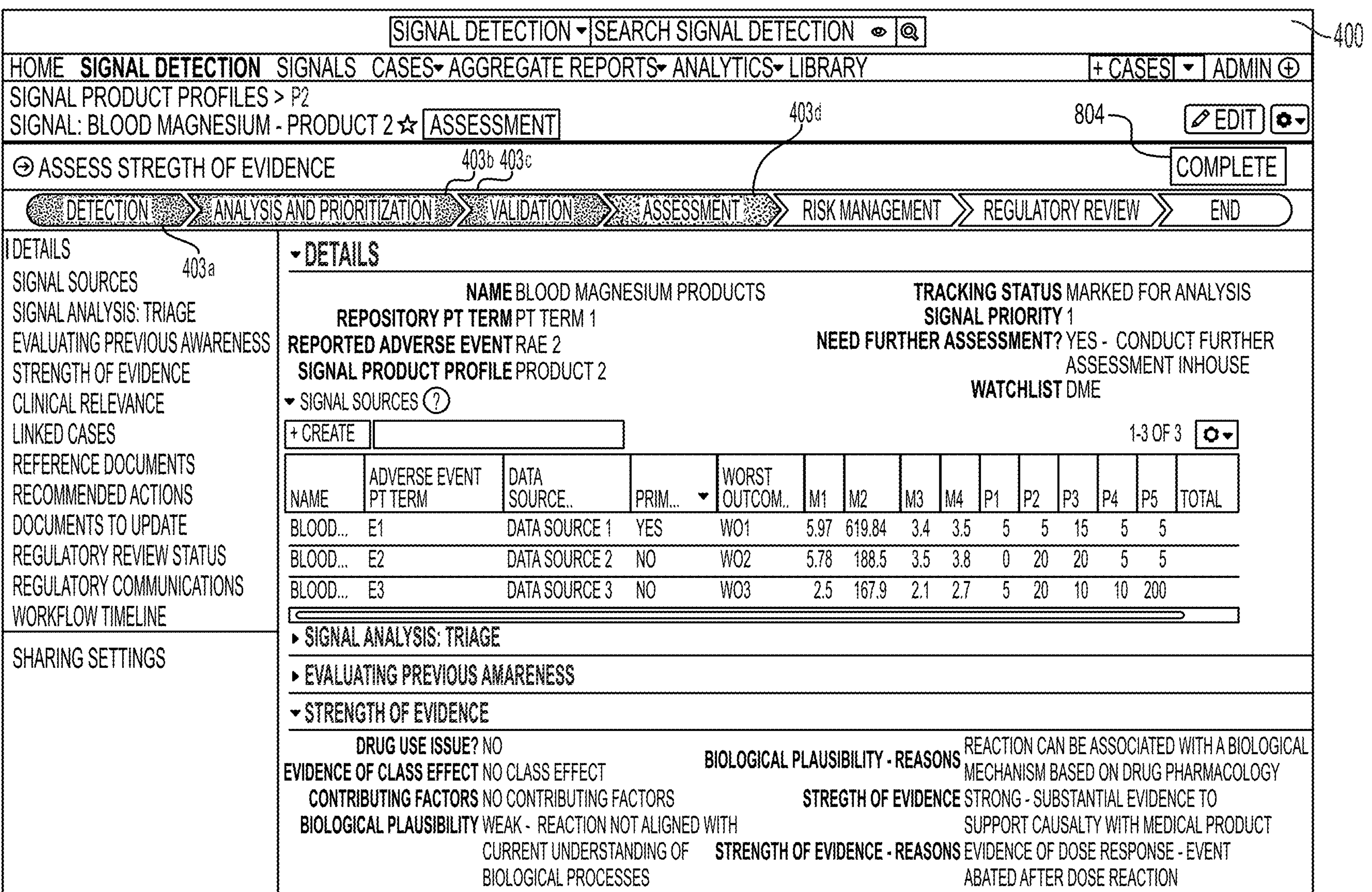
FIG. 8 shows an example interface for displaying a validated signal undergoing further assessment, according to one embodiment.

FIG. 8 shows a transition of the interface 400 from a validation stage to an assessment stage. At this stage of processing the one or more detected signals associated with a given product (e.g., product 2), information about the one or more signals is compared against one or more reference documents such as the reference documents 1102 of FIG. 11, 1202 of FIG. 12, and signal report 1400 of FIG. 14. This ensures that any inconsistencies associated with the prior processing stages may be caught and addressed.

Figure 9:
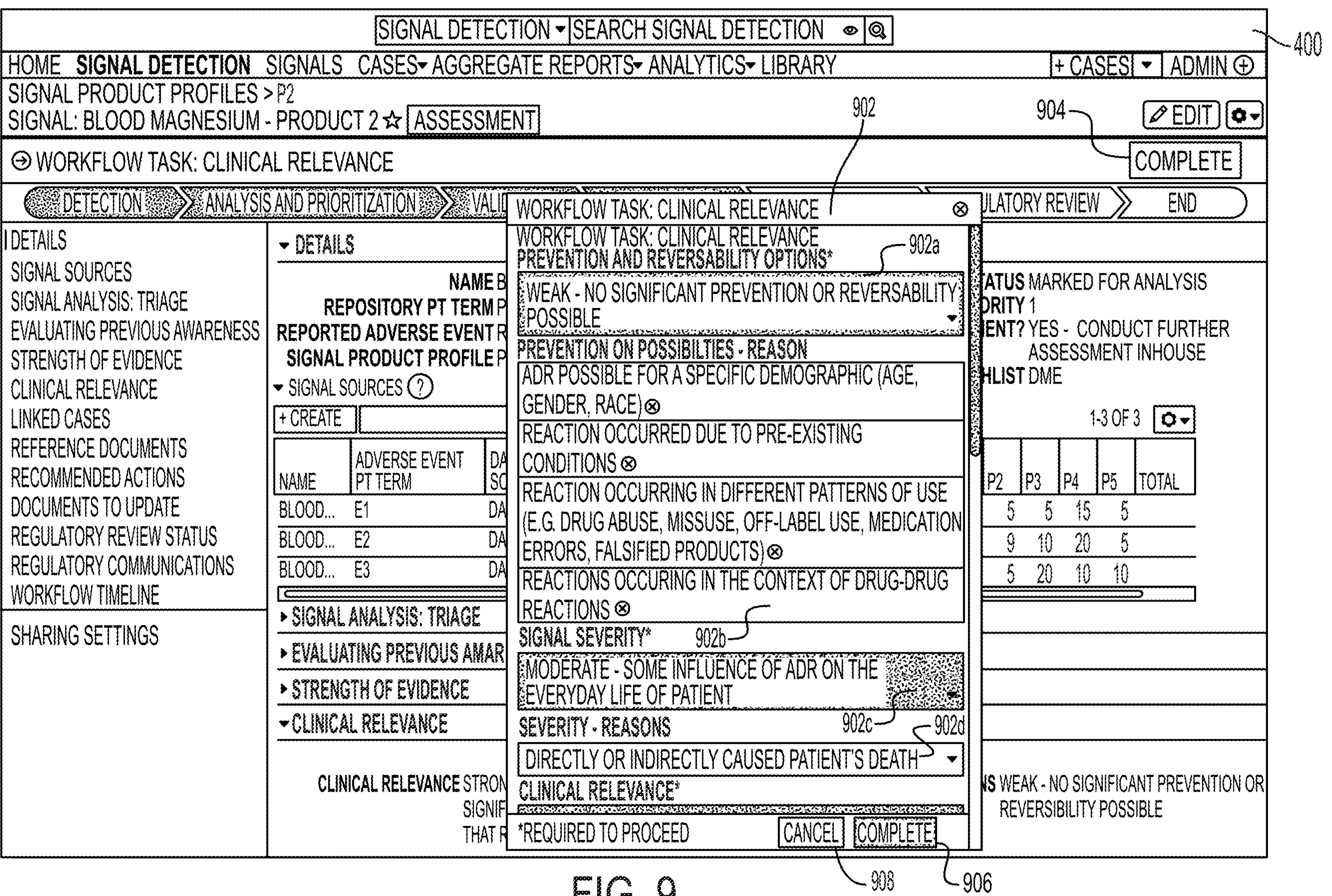
FIG. 9 shows an example interface for configuring aspects of a detected signal undergoing further assessment, according to one embodiment.

FIG. 9 shows an interface 400 for configuring aspects of a detected signal undergoing further assessment, according to one embodiment. The interface 400 may be at the assessment stage 403*d*. In such a case, clinical relevance of the detected signal may be evaluated using a workflow task window 902, which provides a listing of workflow tasks 902*a*, 902*b*, 902*c*, and 902*d* to be addressed by a user. The workflow task 902*a* may be associated with prevention and reversibility options concerning Product 2. The workflow task 902*b* may be associated with the different possibilities for prevention concerning Product 2. The workflow task 902*c* may be associated with signal severity options concerning Product 2. The listing 902 may be associated with reasons for the signal severity concerning Product 2. After the user is completed addressing tasks 902*a*, 902*b*, 902*c*, and 902*d*, the user may click button 906 to close workflow task window 902. Moreover, the user may cancel their entries for tasks 902*a*, 902*b*, 902*c*, and 902*d* by clicking button 908. A new workflow task window 902 may be provided so the user can re-enter entries for tasks 902*a*, 902*b*, 902*c*, and 902*d*. Once the user is done with workflow task window 902, the user can confirm that he/she has completed a workflow task portion of the assessment by clicking button 904.

In some embodiments, each workflow task 902*a*, 902*b*, 902*c*, and 902*d* is provided with a drop menu of options to select. In some embodiments, the user can write responses in a text box to each workflow task 902*a*, 902*b*, 902*c*, and 902*d*.

Figure 10:
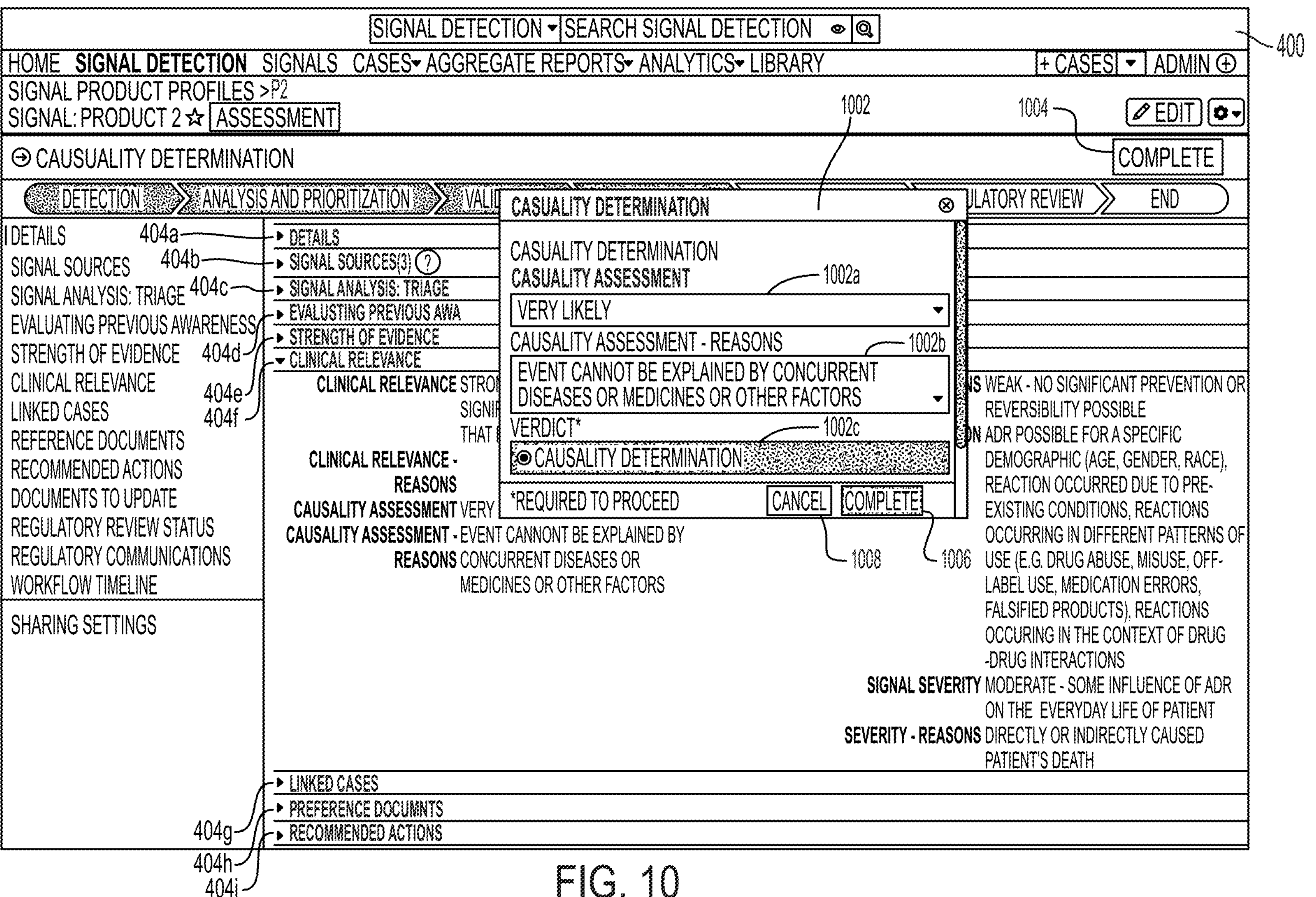
FIG. 10 shows an example interface for further configuring an assessment phase of a signal, according to one embodiment.

FIG. 10 shows an interface 400 for further configuring an assessment phase of a signal, according to one embodiment. The interface 400 may be at the assessment stage 403*d*. After completing workflow tasks 902*a*, 902*b*, 902*c*, and 902*d*, a causality determination window 1002 may be provided to determine if Product 2 is likely the cause of an adverse event. The causality determination window 1002 may include a number of causality determination tasks 1002*a*, 1002*b*, and 1002*c* a user must answer. The workflow task 1002*a* may be associated with assessing the causality of an adverse event involving Product 2. The workflow task 1002*b* may be associated with the reasons for the causality involving Product 2. The workflow task 1002*c* may be associated with the verdict on causality associated with Product 2. The listing 902 may be associated with reasons for the signal severity involving Product 2. After the user has completed addressing tasks 1002*a*, 1002*b*, and 1002*c*, the user may activate (e.g., click) button 1006 to close workflow task window 1002. Moreover, the user may cancel entries for tasks 1002*a*, 1002*b*, and 1002*c* by activating (e.g., clicking) button 1008. A new workflow task window 1002 may be provided so the user can re-enter entries for tasks 1002*a*, 1002*b*, and 1002*c*. Once the user is done with workflow task window 1002, the user can confirm completing the workflow task portion of the assessment by activating (e.g., clicking) button 1004.

In some embodiments, each causality determination tasks 1002*a*, 1002*b*, and 1002*c* may be provided with a drop menu of options to select. In some embodiments, the user may write in a text box responses to each causality determination tasks 1002*a*, 1002*b*, and 1002*c*.

Figure 11:
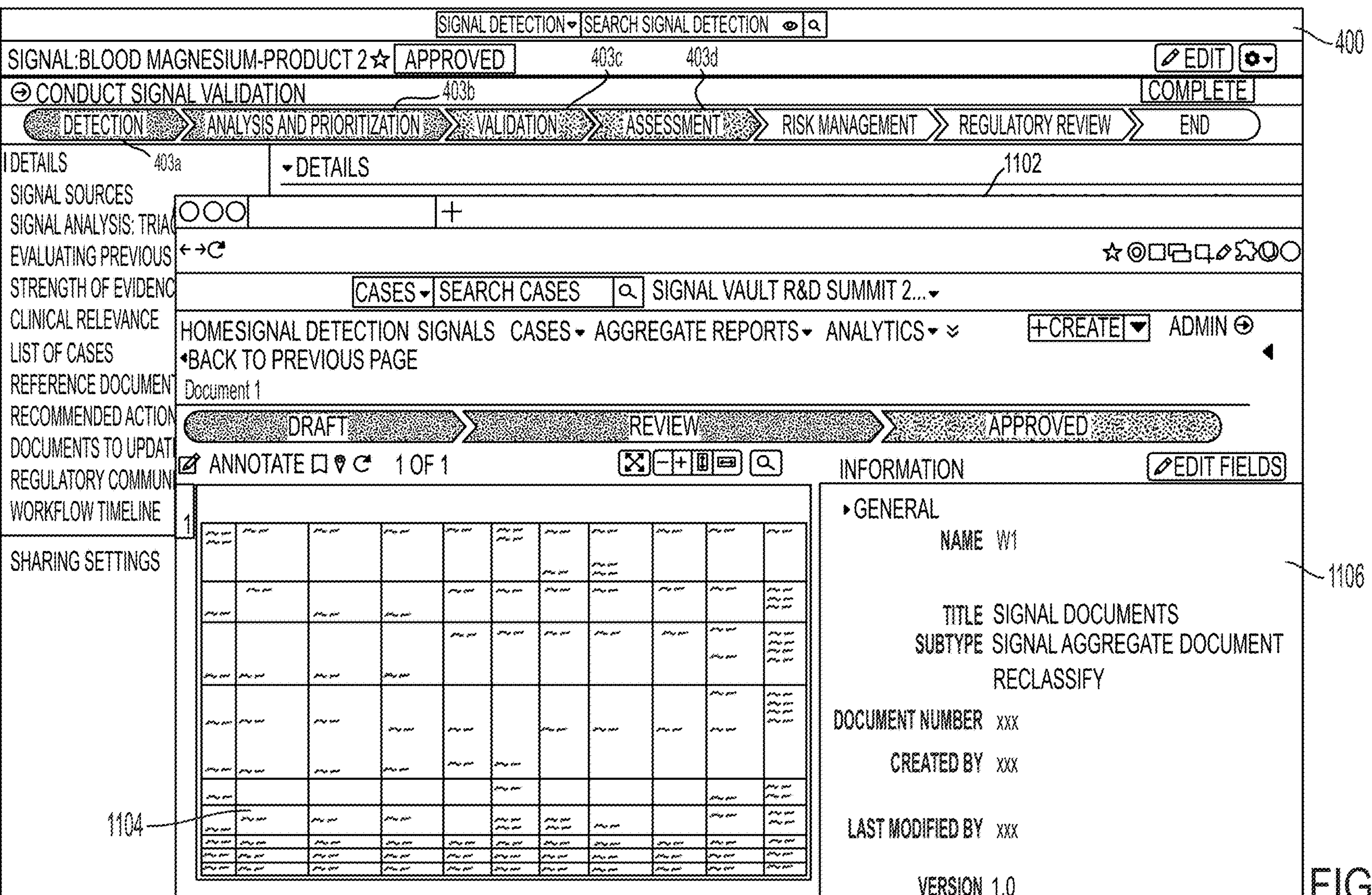
FIG. 11 shows an example interface for displaying a reference document, according to one embodiment.

FIG. 11 shows an example interface for displaying a reference document 1104, according to one embodiment. The interface 400 may still indicate a status indicator 403*d* designating that the detected signal of Product 2 is at the assessment stage. In this case, a document window 1102 may be presented once all information in the workflow task window 902 has been entered. The document window 1102 includes an annotated reference 1104 and an information section 1106. The annotated reference 1104 may be a reference closely aligned with information in workflow task window 902 of Product 2, and may be annotated using information provided in workflow task window 902. The information section 1106 may describe general information regarding annotated reference 1104, such as the name of the reference, title, subtype, document number, who created or modified the document, version data of the document, and the like.

In some embodiments, the underlying document associated with the annotated reference 1104 may be retrieved for a local or remote document storage memory system.

Figure 12:
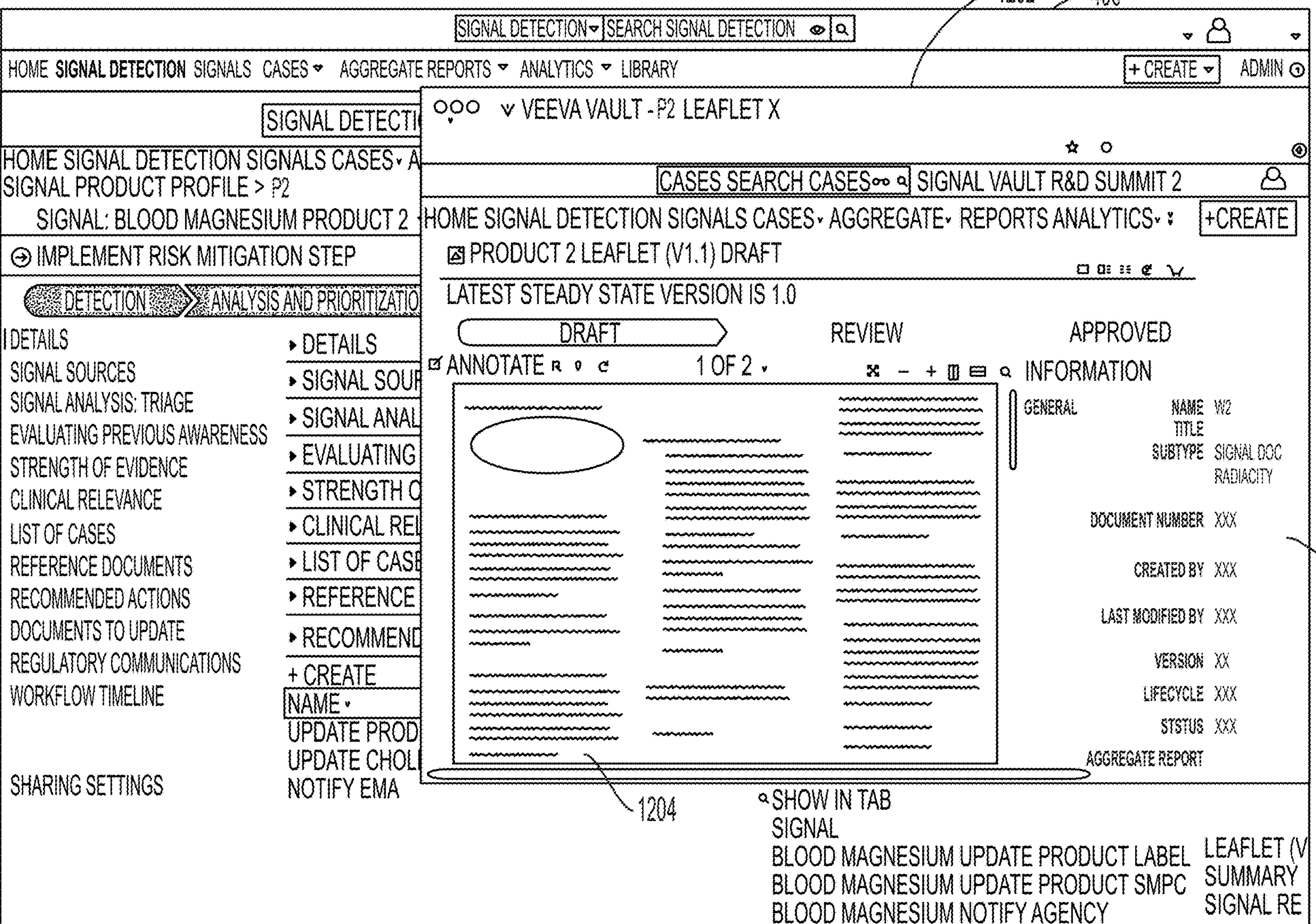
FIG. 12 shows an example interface for displaying another reference document, according to one embodiment.

FIG. 12 shows an example interface for displaying a reference document 1104, according to one embodiment. The interface 400 may indicate a status indicator 403*e* designating the detected signal of Product 2 is at the risk management stage 403*e*. In this case, a document window 1202 may be presented once all information in causality determination window 1002 has been entered. The document window 1202 may include an annotated reference 1204 and an information section 1206. The annotated reference 1204 may be a reference closely aligned with information in the causality determination window 1002 of Product 2, and may be annotated using information provided in the causality determination window 1002. The information section 1206 may describe general information regarding annotated reference 1204, such as the name of the reference, title, status, lifecycle, document number, who created or modified the document, version data of the document, aggregate report, and the like. Under the risk management stage 403*e*, reviewing the one or more reference documents, including information regarding the one or more detected signals, allows one to devise a risk management strategy regarding the producer under review.

In some embodiments, the underlying document associated with the annotated reference 1204 may be retrieved from a local or remote document storage memory system.

FIG. 13 shows an example interface for generating a signal report. A signal report may be generated to notify authorities/regulators regarding an adverse event associated with a signal associated with Product 2, for example. This may be determined by using several statistical analyses to detect adverse events associated with using Product 2. A signal report generation window 1302 may be provided when interface 400 is at the regulatory review stage 403*f*. The signal report generation window 1302 may include a first portion 1304, a second portion 1306, and a third portion 1308.

The first portion 1302 may include profile information retrieved from various stages 403*a* . . . 403*d* of interface 400 regarding the signal of Product 2 as discussed in FIGS. 3-12. The second portion 1306 may focus on signals of disproportionate reporting. The second portion 1306 may list the internal names D1-D3 of the data sources Data Source 1-Data Source 3 used for signal detection, signal priority, total number of cases associated with each local data source Data Source 1-Data Source 3, and statistical analysis information St1-St5 used for signal detection. Note that each data source may produce a different signal that is assessed using statistical analysis information St1-St5. The third portion 1308 may focus on triage and prioritization of Product 2. The information shown in the third portion 1308 may be retrieved from pop-menu 502 of FIG. 5.

Once all information is appropriately entered and evaluated, a signal report 1400 may be generated, as shown in FIG. 14. The signal report 1400 may incorporate information displayed in the signal report generation window 1302. Moreover, the signal report 1400 may be provided to select authorities for determining if Product 2 is viable.

Figure 15:
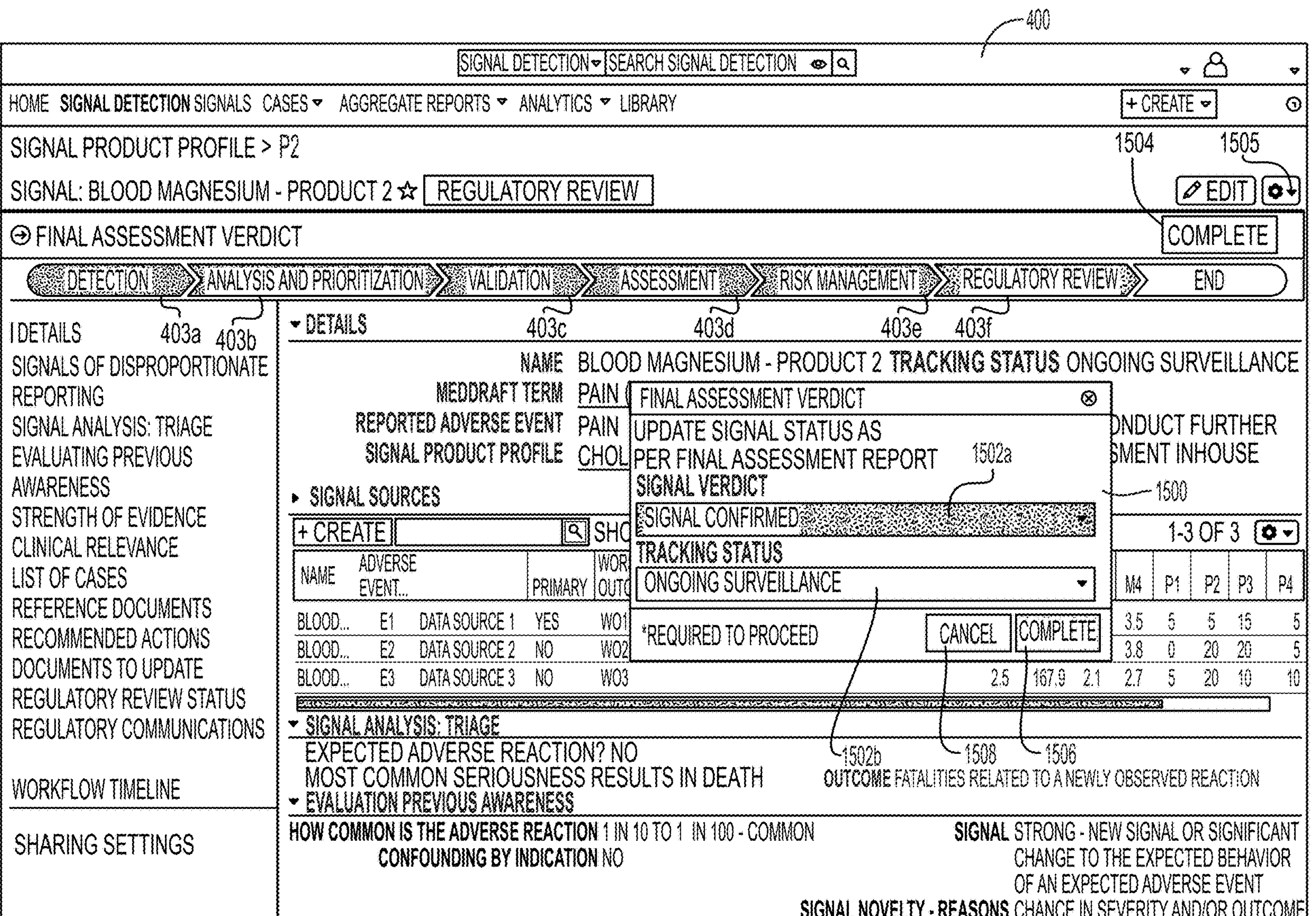
FIG. 15 shows an example interface for configuring a detected signal undergoing further regulatory review, according to one embodiment.

According to one embodiment, FIG. 15 shows an example interface for configuring a detected signal undergoing further regulatory review. After a signal report 1400 is generated, a final assessment verdict window 1502 may be provided. The final assessment verdict of Product 2 may be provided when interface 400 is under regulatory review stage 403*f*. The final assessment verdict window 1502 may be used to give a final assessment verdict based on the signals of Product 2, as shown in FIG. 13. In particular, the final assessment verdict window 1502 may include a signal verdict option 1502*a* and a tracking status option 1502*b*. The signal verdict option 1502*a* may involve a user selecting several options from a pull-down menu, signifying a signal verdict. The tracking status option 1502*b* may include a user choosing several options from a pull-down menu, indicating a tracking status.

After entering the information for signal verdict option 1502*a* and tracking status option 1502*b*, the user may click button 1506 to close final assessment verdict window 1502. Moreover, the user may cancel the entries 1502*a* and 1502*b* by activating (e.g., clicking) button 1508. The interface 400 may provide a new final assessment verdict window 1502, so the user can re-enter entries for signal verdict option 1502*a* and tracking status option 1502*b*. Once the user is done with final assessment verdict window 1502, the user can confirm completing the final assessment verdict portion of the Regulatory Review by activating (e.g., clicking) button 1504.

In some implementations, the signal verdict option 1502*a* and the tracking status option 1502*b* may be manually entered by the user.

Figure 16:
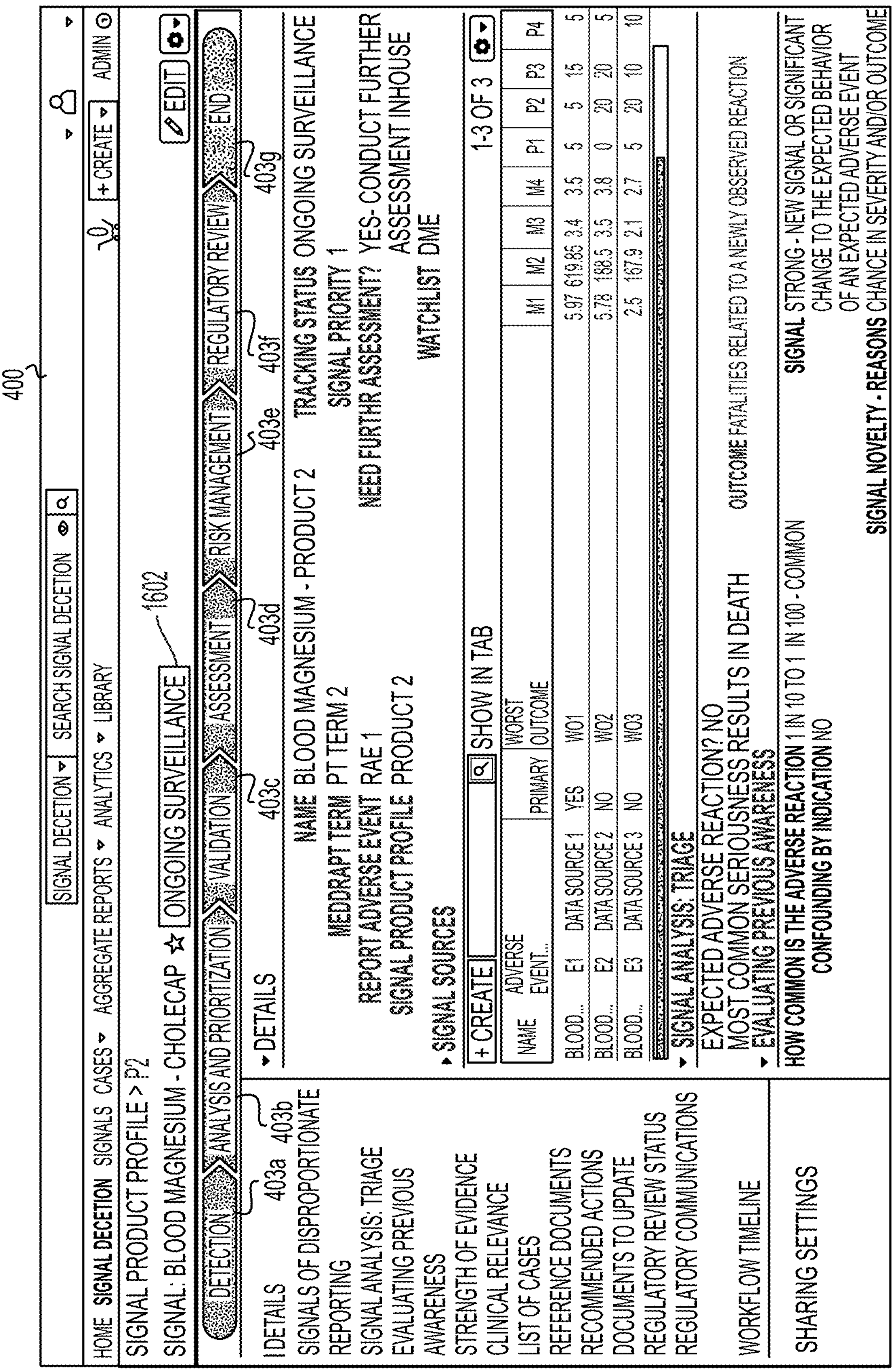
FIG. 16 shows an example interface for placing a signal in a continuous state of surveillance, according to one embodiment.

FIG. 16 shows an example interface for placing a signal in a continuous state of surveillance. After completing the final assessment verdict, interface 400 may enter an end stage 403*g*. At this stage, the signal of Product 2, for example, may be placed on an "ongoing surveillance" protocol 1602 based on the selection of tracking status 1502*b*, as shown in FIG. 15. In this case, tracking status 1502*b* may be selected to initiate an "ongoing surveillance" protocol. The protocol for "ongoing surveillance" 1600 may be a continuous state of surveillance of Product 2 at the end stage 403*g*.

In other embodiments, other protocols may be used for managing or maintaining a different surveillance relationship with Product 2.

Workflow

Figure 17:
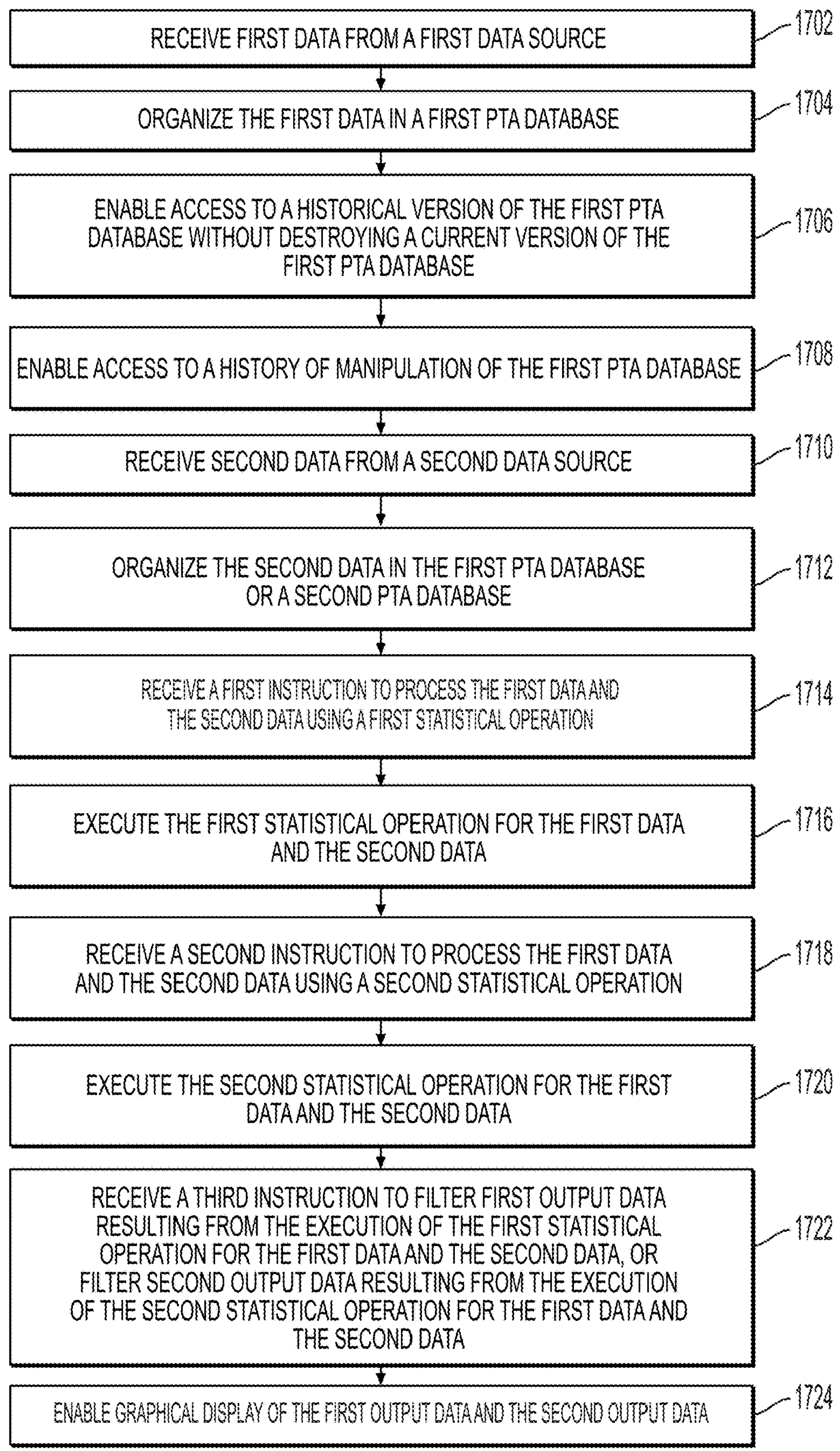
FIG. 17 shows an example flowchart for executing one or more statistical operations on a configured signal, according to one embodiment.

FIG. 17 shows a flowchart for using a point-in-time architecture (PTA) database. In block 1702, first data from a first data source may be received. The first data may include a first record associated with a first attribute and a first event, and a second record associated with a second attribute and a second event. In block 1704, the first data in a first PTA database may be organized using the one or more computing device processors. For each record, the first PTA database may include a first time associated with creation of an entry in the first PTA database for the record and a second time associated with manipulation of the entry in the first PTA database for the record. Access to a historical version of the first PTA database without destroying a current version of the first PTA database is enabled, using the one or more computing device processors, as shown in block 1706. In block 1708, the one or more computing device processors may enable access to a history of manipulation of the first PTA database.

In some implementations, server 105 of FIG. 1 may implement the first PTA database, the second PTA database, or more PTA databases. In other implementations, server 105 may remotely access the first PTA database and the second PTA database using the communication system 208 of FIGS. 2A and 2B. In other implementations, the one or more computing device processors may be one or more of the processors 202 of FIGS. 2A and 2B.

In some implementations, server 105 may organize the first data in the first PTA database by modifying the first data from the first data source to be compatible with the first PTA database. In some implementations, server 105 may send query commands to the first PTA database or the second PTA database to access the first data.

In some embodiments, server 105 may enable access to the history of manipulation by providing a listing of the history of manipulation. In some embodiments, the listing may be a database listing or text file. In some embodiments, server 105 utilizes logic that adjust the second data to be compatible with the first PTA database or the second PTA database In block 1710, the second data from a second data source is received using the one or more computing device processors. The second data may include a third record associated with a third attribute and a third event, and a fourth record associated with a fourth attribute and a fourth event. The second data may be organized in the first PTA database or a second PTA database, organizing using the one or more computing device processors, as shown in block 1712. In block 1714, a first instruction may be received to process the first data and the second data using a first statistical operation using the one or more computing device processors. The first statistical operation may include one or more first parameters. The first statistical operation for the first data and the second data may be executed using the one or more computing device processors, as shown in block 1716.

In some implementations, server 105 may organize the first data in the first PTA database by modifying the first data from the first data source to be compatible with the first PTA database. In some implementations, server 105 may send query commands to the first PTA database or the second PTA database to access the first data. In some implementations, server 105 may send query commands to the first PTA database or the second PTA database to access the second data.

In some embodiments, the first statistical operation may include the same statistical operations used to define the statistical metrics 306*a* . . . 306*e*. In some embodiments, the statistical operation may include one or more point-in time statistical operations.

In some implementations, server 105 may receive the first instruction to process the first data and the second data using the first statistical operation. In some implementations, server 105 determines if the information in the first data and the second data valid to perform the first statistical operation. In some implementations, interface 300 allows a user to evaluate the first data and the second data before executing the first statistical operation.

In block 1718, a second instruction may be received to process the first data and the second data using a second statistical operation, wherein the second statistical operation comprises one or more second parameters using the one or more computing device processors. The second statistical operation may be executed for the first data and the second data using the one or more computing device processors, as shown in block 1720. In block 1722, a third instruction may be received to filter first output data resulting from the execution of the first statistical operation for the first data and the second data, or filter second output data resulting from the execution of the second statistical operation for the first data and the second data using the one or more computing device processors. The filtering of the first output data or the second output data is based on a user-selected attribute associated with records comprised in the first data or the second data, respectively. In block 1724, simultaneous graphical display of the first output data resulting from the execution of the first statistical operation for the first data and the second data, and graphical display of the second output data resulting from the execution of the second statistical operation for the first data and the second data may be enabled, on a single user interface. Note the first output data and the second output data may be considered signals because they have processed using one or more statistical operation.

In some embodiments, the first statistical operation may include the same statistical operations used to define the statistical metrics 306A . . . 306E. In some embodiments, the statistical operation may include one or more point-in time statistical operations. In some embodiments, interface 300 via server 105 may be used define which one of the statistical operations. In some implementations, interface 300 allows a user to evaluate the first data and the second data before executing the second statistical operation. In some embodiments, the first statistical operation and the second statistical operation include point-in-time statistical metrics or operations, such as EBGM or the like.

In some embodiments, the user-selected attribute associated with the records may include point-in-time statistical metrics, such as EBGM or the like.

In some embodiments, server 105 receives the second instruction to process the first data and the second data using the second statistical operation. In some embodiments, server 105 determines if the information in the first data and the second data can be used to perform the second statistical operation. In some embodiments, interface 400 via server 105 may be used define which one of the statistical operations is used at the analysis and prioritization stage 403*b*.

In some implementations, server 105 receives the third instruction to filter first output data resulting from the execution of the first statistical operation for the first data and the second data, or filter second output data resulting from the execution of the second statistical operation. In some implementations, server 105 validates the first output data and the second output data.

In some implementations, interface 300 may receive the first instruction or the second instruction to process the first data and the second data using the first statistical operation or the second statistical operation. In some implementations, the user interface may allow a user to evaluate the first data and the second data before performing the first statistical operation. In some implementations, the interface 300 may display the first and the second data before performing the first statistical operation or the second statistical operation. In some implementations, the interface 300 may be configured to simultaneously display the first output data and the second output to one or more users. In some implementations, the interface 300 may further include displaying information associated with the first output data and the second output data.

Once the first output data and the second output are identified, interface 400 of FIGS. 3-16 may identify the first output data and the second output data as one or more signals associated with a product.

In some embodiments, interface 400 of FIGS. 3-16 may detect one or more signals associated with the first output data and the second output data. In some embodiments, interface 400 allows for the one or more detected signals to be parameterized using a plurality of stages. In some embodiments, the plurality of stages used to configure the one or more detected signals may include a detection phase, an analysis and prioritization phase, a validation phase, an assessment phase, a risk management phase, and a regulatory review phase, as discussed in FIGS. 3-16. In some embodiments, interface 400 may manage the one or more signals associated with the first output data and the second output data for later processing.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment. In some embodiments, the terms "signal," "data," and/or "information" may be used interchangeably. In some embodiments, signals refer to non-transitory signals.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A method for using a point-in-time architecture (PTA) database, the method comprising:

receiving, using one or more computing device processors, first data from a first data source, wherein the first data comprises a first record associated with a first attribute and a first event, and a second record associated with a second attribute and a second event;

entering, using the one or more computing device processors, the first data into a first PTA database, wherein for each record, the first PTA database comprises a first time associated with creation of an entry in the first PTA database for the record or a second time associated with manipulation of the entry in the first PTA database for the record;

receiving, using the one or more computing device processors, a first instruction to process the first data using a first statistical operation, wherein the first statistical operation comprises one or more first parameters;

executing, using the one or more computing device processors, the first statistical operation for the first data;

after executing the first statistical operation for the first data, receiving, using the one or more computing device processors, a second instruction to filter first output data resulting from the execution of the first statistical operation for the first data, wherein the filtering of the first output data is based on a user-selected attribute associated with records comprised in the first data;

enabling, using the one or more computing device processors, graphical display of the first output data resulting from the execution of the first statistical operation for the first data, and first information associated with the first output data;

enabling, using the one or more computing device processors, graphical display of a first stage of a data processing operation for the first output data;

receiving, using the one or more computing device processors, first user input for the first stage of the data processing operation for the first output data, wherein the first user input comprises at least one first configuration parameter for executing the first stage of the data processing operation;

executing, using the one or more computing device processors, based on the at least one first configuration parameter, the first stage of the data processing operation for the first output data;

after executing the first stage of the data processing operation for the first output data, enabling, using the one or more computing device processors, graphical display of a second stage of the data processing operation for the first output data;

receiving, using the one or more computing device processors, second user input for the second stage of the data processing operation for the first output data, wherein the second user input comprises at least one second configuration parameter for executing the second stage of the data processing operation for the first output data;

executing, using the one or more computing device processors, based on the at least one second configuration parameter, the second stage of the data processing operation for the first output data;

after executing the second stage of the data processing operation for the first output data, enabling, using the one or more computing device processors, graphical display of a first option to return to the first stage of the data processing operation for the first output data or a second option to reconfigure the at least one first configuration parameter or the at least one second configuration parameter; and providing a user interface for displaying a plurality of stages for managing information in the first output data, wherein the plurality of stages comprises:

a detection stage for detecting the first output data;

an analysis or prioritization stage for analyzing or prioritizing the first output data based on the information in the first output data;

a validating stage for validating the first output data; and an assessment stage for comparing the information in the first output data to one or more reference data.

2. The method of claim 1, wherein receiving the first data into the first PTA database and comprises modifying the first data to be compatible with the first PTA database.

3. The method of claim 1, further comprising sending query commands to the first PTA database.

4. The method of claim 1, wherein the detection stage enables displaying the first output data.

5. The method of claim 1, wherein the one or more reference data comprise one or more reference documents associated with the information in the first output data, and wherein the information in the first output data is compared to the one or more reference documents.

6. The method of claim 1, wherein the plurality of stages further comprises a regulatory review stage, wherein the regulatory review stage produces a data report regarding the first output data based on the regulatory information.

7. A system for using a point-in-time architecture (PTA) database, the system comprising at least one PTA database;

one or more computing device processors; and one or more computing device memories, coupled to the at least one PTA database and the one or more computing device processors, the one or more computing device memories storing instructions executed by the one or more computing device processors, wherein the instructions are configured to:

receive first data from a first data source, wherein the first data comprises a first record associated with a first attribute and a first event, and a second record associated with a second attribute and a second event;

enter the first data into a first PTA database, wherein for each record, the first PTA database comprises a first time associated with creation of an entry in the first PTA database for the record or a second time associated with manipulation of the entry in the first PTA database for the record;

receive a first instruction to process the first data using a first statistical operation, wherein the first statistical operation comprises one or more first parameters;

execute the first statistical operation for the first data;

after executing the first statistical operation for the first data, receive a second instruction to filter first output data resulting from the execution of the first statistical operation for the first data, wherein the filtering of the first output data is based on a user-selected attribute associated with records comprised in the first data;

enable graphical display of the first output data resulting from the execution of the first statistical operation for the first data, and first information associated with the first output data;

enable graphical display of a first stage of a data processing operation for the first output data;

receive first user input for the first stage of the data processing operation for the first output data, wherein the first user input comprises at least one first configuration parameter for executing the first stage of the data processing operation for the first output data;

execute, based on the at least one first configuration parameter, the first stage of the data processing operation for the first output data;

after executing the first stage of the data processing operation for the first output data, enable graphical display of a second stage of the data processing operation for the first output data;

receive second user input for the second stage of the data processing operation for the first output data, wherein the second user input comprises at least one second configuration parameter for executing the second stage of the data processing operation for the first output data;

execute, based on the at least one second configuration parameter, the second stage of the data processing operation for the first output data;

after executing the second stage of the data processing operation for the first output data, enable graphical display of a first option to return to the first stage of the data processing operation for the first output data or a second option to reconfigure the at least one first configuration parameter or the at least one second configuration parameter; and provide a user interface for displaying a plurality of stages for managing information in the first output data, wherein the plurality of stages comprises:

a detection stage for detecting the first output data;

an analysis or prioritization stage for analyzing or prioritizing the first output data based on the information in the first output data;

a validating stage for validating the first output data; and an assessment stage for comparing the information in the first output data to one or more reference data.

8. The system of claim 7, wherein the instructions are further configured to adjust the first data to be compatible with the first PTA database.

9. The system of claim 7, wherein the instructions are further configured to send query commands to the first PTA database.

10. The system of claim 7, wherein the first statistical operation comprises an Empirical Bayes Geometric Mean (EBGM)-based operation a Proportional Reporting Ratio (PRR)-based operation, or a Chi-Square-based operation.

11. The system of claim 7, wherein the instructions are further configured to provide a second user interface for allowing a user to evaluate the first data before executing the first statistical operation, wherein the user interface displays the first data before executing the first statistical operation.

12. The system of claim 7, wherein the instructions are further configured to provide a second user interface for displaying the first output data, wherein the user interface further includes second information associated with the first output data.

13. The system of claim 7, wherein the instructions are configured to further provide a second user interface for managing the first output data, wherein the user interface allows for the first output data to be parameterized for processing.

14. The method of claim 1, wherein the first stage of the data processing operation or the second stage of the data processing operation comprises one or more of a detection phase, an analysis and prioritization phase, a validation phase, an assessment phase, a risk management phase, and a regulatory review phase.

15. The system of claim 7, wherein the first stage of the data processing operation or the second stage of the data processing operation comprises one or more of a detection phase, an analysis and prioritization phase, a validation phase, an assessment phase, a risk management phase, and a regulatory review phase.

16. The system of claim 7, wherein the instructions are further configured to modify the first data to be compatible with the first PTA database.

* * * * *